(12) United States Patent
Yasuno

(10) Patent No.: US 9,952,045 B2
(45) Date of Patent: Apr. 24, 2018

(54) CALIBRATION METHOD OF FORM MEASURING DEVICE

(71) Applicant: MITUTOYO CORPORATION, Kanagawa (JP)

(72) Inventor: Madoka Yasuno, Kure (JP)

(73) Assignee: MITUTOYO CORPORATION, Kanagawa (JP)

( * ) Notice: Subject to any disclaimer, the term of this patent is extended or adjusted under 35 U.S.C. 154(b) by 149 days.

(21) Appl. No.: 15/062,571

(22) Filed: Mar. 7, 2016

(65) Prior Publication Data

US 2016/0265912 A1 Sep. 15, 2016

(30) Foreign Application Priority Data

Mar. 9, 2015 (JP) ................. 2015-045978

(51) Int. Cl.
*G01B 21/00* (2006.01)
*G01B 21/04* (2006.01)
*G01B 3/30* (2006.01)

(52) U.S. Cl.
CPC ............. *G01B 21/042* (2013.01); *G01B 3/30* (2013.01)

(58) Field of Classification Search
USPC ........................................................ 73/1.79
See application file for complete search history.

(56) References Cited

U.S. PATENT DOCUMENTS

| | | | | |
|---|---|---|---|---|
| 4,070,762 A | * | 1/1978 | Siddall | G01B 7/282 33/504 |
| 2001/0008994 A1 | * | 7/2001 | Omori | B23Q 17/20 702/95 |
| 2005/0234671 A1 | * | 10/2005 | Morfino | G05B 19/4015 702/95 |
| 2010/0292946 A1 | * | 11/2010 | Tamai | G01B 21/042 702/94 |
| 2011/0000277 A1 | * | 1/2011 | MacManus | G01B 21/042 73/1.79 |
| 2014/0083162 A1 | * | 3/2014 | Seewig | B24B 49/045 73/1.79 |

FOREIGN PATENT DOCUMENTS

| | | |
|---|---|---|
| JP | 2012-145492 | 8/2012 |
| JP | 5292564 | 9/2013 |

* cited by examiner

*Primary Examiner* — Eric S McCall
*Assistant Examiner* — Mohammed E Keramet-Amircolai
(74) *Attorney, Agent, or Firm* — Greenblum & Bernstein, P.L.C.

(57) ABSTRACT

A calibration gauge having plane symmetry is set in a position other than a rotation center of a rotary table. The calibration gauge is measured while the rotary table is driven to rotate. Offset of a measurement axis is determined based on a phase pattern of the rotary table when a stylus head detects the calibration gauge.

18 Claims, 27 Drawing Sheets

CALIBRATION METHOD OF FORM MEASURING DEVICE

CROSS-REFERENCE TO RELATED APPLICATIONS

The present application claims priority under 35 U.S.C. § 119 of Japanese Application No. 2015-045978, filed on Mar. 9, 2015, the disclosure of which is expressly incorporated by reference herein in its entirety.

BACKGROUND OF THE INVENTION

1. Field of the Invention

The present invention relates to a calibration method of a form measuring device.

2. Description of Related Art

As an example of a form measuring device, a roundness measuring device is known. A roundness measuring device includes a rotation mechanism and closely measures changes in radius of a measured object having a round shape.

First, a simple description of a configuration of a roundness measuring device is provided. FIG. 1 is an external view of a roundness measuring device 100. X, Y, and Z axes of a machine coordinate system are noted in the figure. The X axis runs from left to right on the drawing sheet. The Y axis runs from a front of the drawing sheet inward. The Z axis runs from the bottom upward.

The roundness measuring device 100 includes a measuring device main body 200, a host computer 110, a console 120, and a motion controller 130.

The measuring device main body 200 includes a stand 210, a rotary table 220, and a coordinate measurer 300.

The rotary table 220 includes a rotation driver 221 and a placement stage 223. The rotation driver 221 is installed on the stand 210 and causes the disc-shaped placement stage 223 to rotate. Adjustment knobs 222 are provided on a side surface of the rotation driver 221 at 90° intervals in a circumferential direction. By operating the adjustment knobs 222, the placement stage 223 can be adjusted in each of the X axis direction, Y axis direction, and Z axis direction, thus enabling the placement stage 223 to be centered and made horizontal. When a measured object is set on the placement stage 223, the measured object rotates together with the placement stage 223.

The coordinate measurer 300 includes a Z axis column 310, a Z slider 320, an X arm 330, a head holder 340, and a probe head 350.

The Z axis column 310 stands upright on the stand 210, parallel to the Z axis. The Z slider 320 is provided to the Z axis column 310 so as to be capable of displacement in the Z direction (up-down direction). The X arm 330 is supported on the Z slider 320 so as to be capable of advancing and retreating in the X direction. The head holder 340 is an "L" shaped member and is attached at a base end to a forefront end of the X arm 330. The probe head 350 is attached to the forefront end of the head holder 340.

The head holder 340 is provided so as to be capable of rotating centered on a rotary shaft 331 extending in the X axis direction. A rotation range is limited, for example, to a range of 0° to −90°. When the head holder 340 is vertical, as in FIG. 2, this is referred to as a "vertical orientation."

When the head holder 340 is horizontal, as in FIG. 3, this is referred to as a "horizontal orientation."

The probe head 350 is a lever-type electric micrometer and is attached to the forefront end of the head holder 340. The probe head 350 includes a stylus 360, and a stylus head 361 which contacts the measured object is provided to the forefront end of the stylus 360. The stylus 360 is provided so as to be capable of tilting such that the forefront end can be displaced in the X axis direction. In this example, the lever-type electric micrometer is used; however, the probe head 350 may also be a parallel displacement-type electric micrometer, or some other existing probe head can be used.

When the head holder 340 is in the vertical orientation (FIG. 2), by turning a calibration screw 341 provided on the side surface of the head holder 340, the probe head 350 can be finely displaced in the Y direction. Alternatively, when the head holder 340 is in the horizontal orientation (FIG. 3), by turning a calibration screw 342 provided on an end surface of the head holder 340, the probe head 350 can be finely displaced in the Y direction.

Moreover, an angle of the stylus 360, an angle of inclination of the head holder 340, an amount of advance/retreat of the X arm 330, and a position (lift/lower amount) of the Z slider 320 are detected by respective encoders (not shown in the drawings).

The host computer 110 is a computer terminal that includes a CPU (central processing unit), a ROM storing predetermined programs, and a RAM. Together with providing a predetermined operation instruction to the motion controller 130, the host computer 110 executes a computation such as form analysis of a measured object W based on data obtained by the measuring device main body 200. The host computer 110 also provides a user with an input/output interface via a monitor 112, a keyboard, and a mouse. By manual operation panel of an operation lever or operation button provided to the console 120, an operation instruction is provided to the motion controller 130. The motion controller 130 executes drive control of the measuring device main body 200.

When measuring the roundness of a measured object, the rotary table 220 is driven to rotate in a state where the stylus head 361 is in contact with a surface of the measured object. Doing this allows the stylus head 361 to scan (trace) over the surface of the measured object. In other words, when the measured object rotates due to the rotation drive of the rotary table 220, the stylus head 361 displaces in the X axis direction in accordance with changes in radius of the measured object. Specifically, the X arm 330 advances and retreats in accordance with changes in radius of the measured object, and thus the stylus head 361 displaces in the X axis direction and the stylus head 361 follows the surface of the measured object. When the rotary table 220 has completed one rotation, the Z slider 320 displaces upward or downward and repeats the circumferential direction scan of the measured object. The angle of the stylus 360, the position of the X arm 330, and the position of the Z slider 320 are detected by respective encoders (not shown in the drawings), and a displacement amount of the stylus head 361 is obtained as measurement data. Form analysis (i.e., analysis of the roundness or cylindricality) of the measured object is performed based on the measurement data.

During measurement using the roundness measuring device 100, axis alignment must first be performed such that a rotation axis of the rotary table 220 and a measurement axis L of the stylus head 361 intersect at a right angle on the same plane. The measurement axis L refers to an imaginary line running through the center of the stylus head 361 and parallel to the X axis. The stylus head 361 displaces due to the advance and retreat of the X arm 330. Therefore, the measurement axis L corresponds to, i.e., a movable direction of the stylus head 361 (in a state where the position of the Z slider 320 is fixated). In addition, a task of aligning the measurement axis L is referred to in the present specification as "measurement axis alignment."

In a hypothetical case where a measurement task is performed in a state where the measurement axis L is not orthogonal to the rotation axis line of the rotary table 220, displacement of the stylus head 361 obviously does not accurately correspond to changes in the radius of the measured object. For example, in a case where the stylus 360 is swapped out, or a case where the angle of inclination of the stylus 360 is changed, or a case where the angle (orientation) of the head holder 340 is changed, "measurement axis alignment" must be performed.

Conventionally, "measurement axis alignment" has been performed as follows (see, for example, Japanese Patent No. 5,292,564 and Japanese Patent Laid-open Publication No. 2012-145492). First, a master ball 90 having a sphere at its tip is prepared. The master ball 90 is set at the center of the rotary table 220 (see FIGS. 2 and 3), then centering is performed. In other words, the center of the sphere is aligned with the rotation axis line of the rotary table 220. Next, the stylus head 361 is brought into contact with the sphere and, in this state, the Y direction calibration screw (341 or 342) is turned, and a position achieving maximum X-direction displacement of the stylus head 361 is located. Once the location where maximum X-direction displacement of the stylus head 361 is found, the Y direction calibration screw (341 or 342) is stopped at that point.

"Measurement axis alignment" can be accurately conducted using the above-noted procedure. However, because the master ball 90 must be set in the center of the rotary table 220, the measured object must be removed temporarily. Then, after the "measurement axis alignment" is performed, the measured object must once again be set on the rotary table 220 and must once again be centered. In some situations, the stylus 360 may be swapped out or the orientation of the head holder 340 may be changed in the middle of measuring the measured object. Requiring the above-noted procedure each time the stylus 360 is swapped out or the orientation is changed takes time and effort and makes improving measurement efficiency difficult.

The present invention reduces the time and effort required for measurement axis alignment, and improves the measurement efficiency of a form measuring device.

SUMMARY OF THE INVENTION

In a method of determining axis offset of a form measuring device according to the present invention, the form measuring device includes a rotary table on which a measured object is placed and which is capable of rotating centered on a Z axis; and a coordinate measurer having a stylus head detecting the measured object, the coordinate measurer causing the stylus head to advance and retreat in a direction parallel to an X axis, where the X axis, Y axis, and Z axis are mutually orthogonal to each other, and executing a tracing measurement along a surface of the measured object using the stylus head. When an imaginary line running through a center of the stylus head and parallel to the X axis is taken as a measurement axis, a calibration method of the form measuring device includes setting a calibration gauge having plane symmetry in a position other than a rotation center of the rotary table; measuring the calibration gauge while driving the rotary table to rotate; and, based on a phase pattern of the rotary table when the stylus head detects the calibration gauge, determining whether the measurement axis is offset with respect to a rotation axis of the rotary table.

In the present invention, preferably, based on measurement results of the calibration gauge, a detection initiation phase $\theta i$, which is a phase of the rotary table when the stylus head begins detection of the calibration gauge; a detection end phase $\theta f$, which is a phase of the rotary table when the stylus head ends detection of the calibration gauge; and a peak phase $\theta p$, which is a phase of the rotary table when a measured value exhibits a peak value, are found, and when an axis offset index value M is defined such that $M=\{(\theta p-\theta i)-(\theta f-\theta p)\}$, a direction of offset of the measurement axis is determined depending on whether the axis offset index value M is positive or negative.

In the present invention, preferably, the calibration gauge is set on a side surface of the rotary table ahead of time.

In the present invention, preferably, the calibration gauge is an entire or partial sphere.

In a calibration method of a form measuring device according to the present invention, positions of the stylus head and the rotary table are capable of fine relative calibration in a direction along the Y axis; after executing the method of determining axis offset of the form measuring device, determination results of an offset direction of the measurement axis are displayed on a monitor; and a user refers to the monitor display to perform fine calibration of the position of the stylus head.

In a program determining axis offset of a form measuring device according to the present invention, the form measuring device includes a rotary table on which a measured object is placed and which is capable of rotating centered on a Z axis; a coordinate measurer having a stylus head detecting the measured object, the coordinate measurer causing the stylus head to advance and retreat in a direction parallel to an X axis, where the X axis, Y axis, and Z axis are mutually orthogonal to each other, and executing a tracing measurement along a surface of the measured object using the stylus head; and a host computer performing operation control of the rotary table and the coordinate measurer via a motion controller. A calibration gauge having plane symmetry is set at a position other than a rotation center of the rotary table and, when an imaginary line running through a center of the stylus head and parallel to the X axis is taken as a measurement axis, the program determining axis offset of the form measuring device executes, on a computer, measurement of the calibration gauge while driving the rotary table to rotate; and, based on a phase pattern of the rotary table when the stylus head detects the calibration gauge, determination of whether the measurement axis is offset with respect to a rotation axis of the rotary table.

A form measuring device according to the present invention includes a rotary table on which a measured object is placed and which is capable of rotating centered on a Z axis; a calibration gauge having plane symmetry, the calibration gauge being set in a position other than a rotation center of the rotary table; and a coordinate measurer having a stylus head detecting the measured object, the coordinate measurer causing the stylus head to advance and retreat in a direction parallel to an X axis, where the X axis, Y axis, and Z axis are mutually orthogonal to each other, and executing a tracing measurement along a surface of the measured object using the stylus head.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
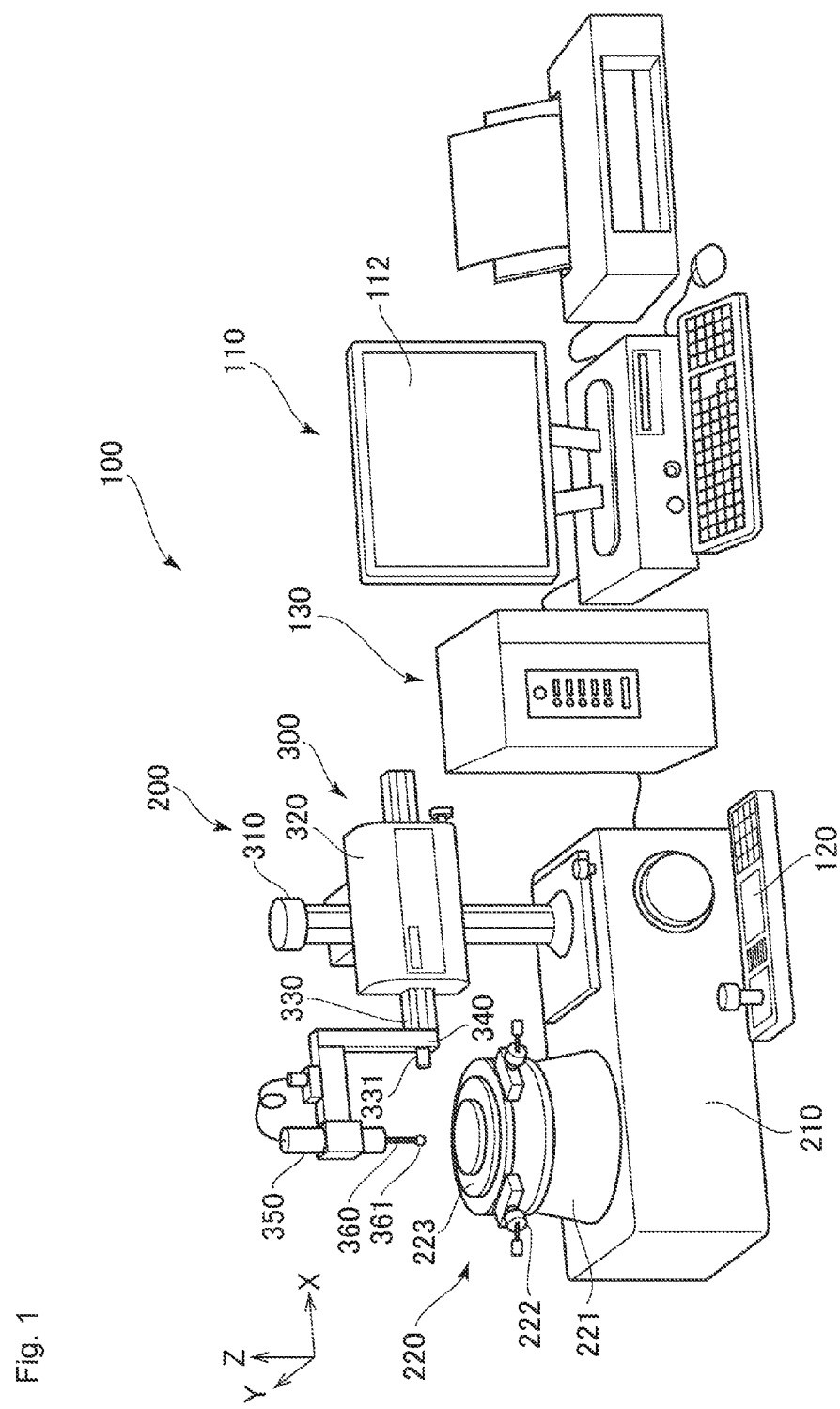
FIG. 1 is an external view of a roundness measuring device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of an embodiment of the present invention is given with reference to the drawings and to the reference numerals assigned to each component in the drawings.

First Embodiment

Figure 4:
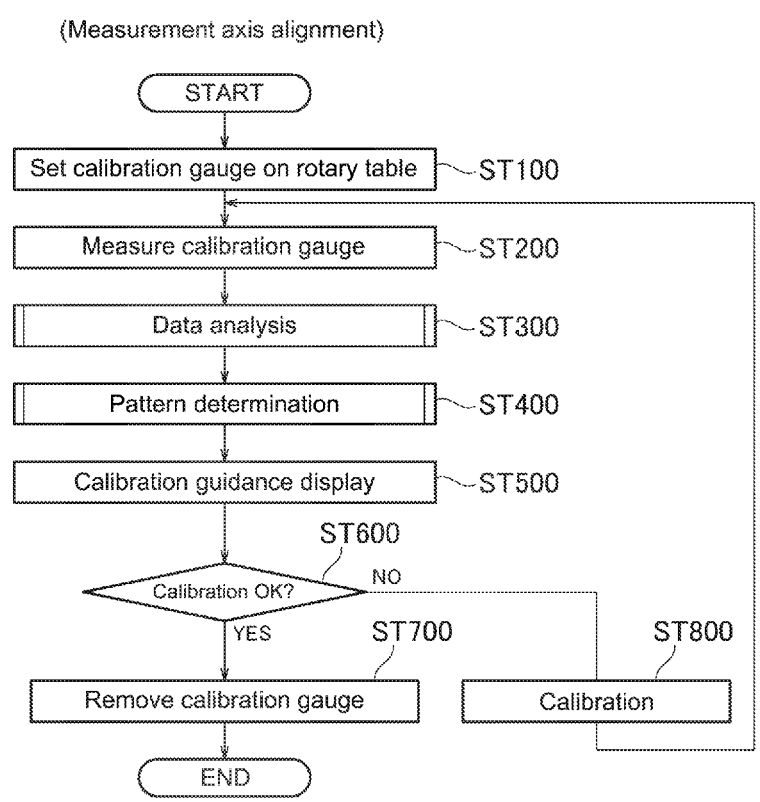
FIG. 4 is a flow chart illustrating a procedure of a method of aligning a measurement axis of the roundness measuring device.
Figure 5:
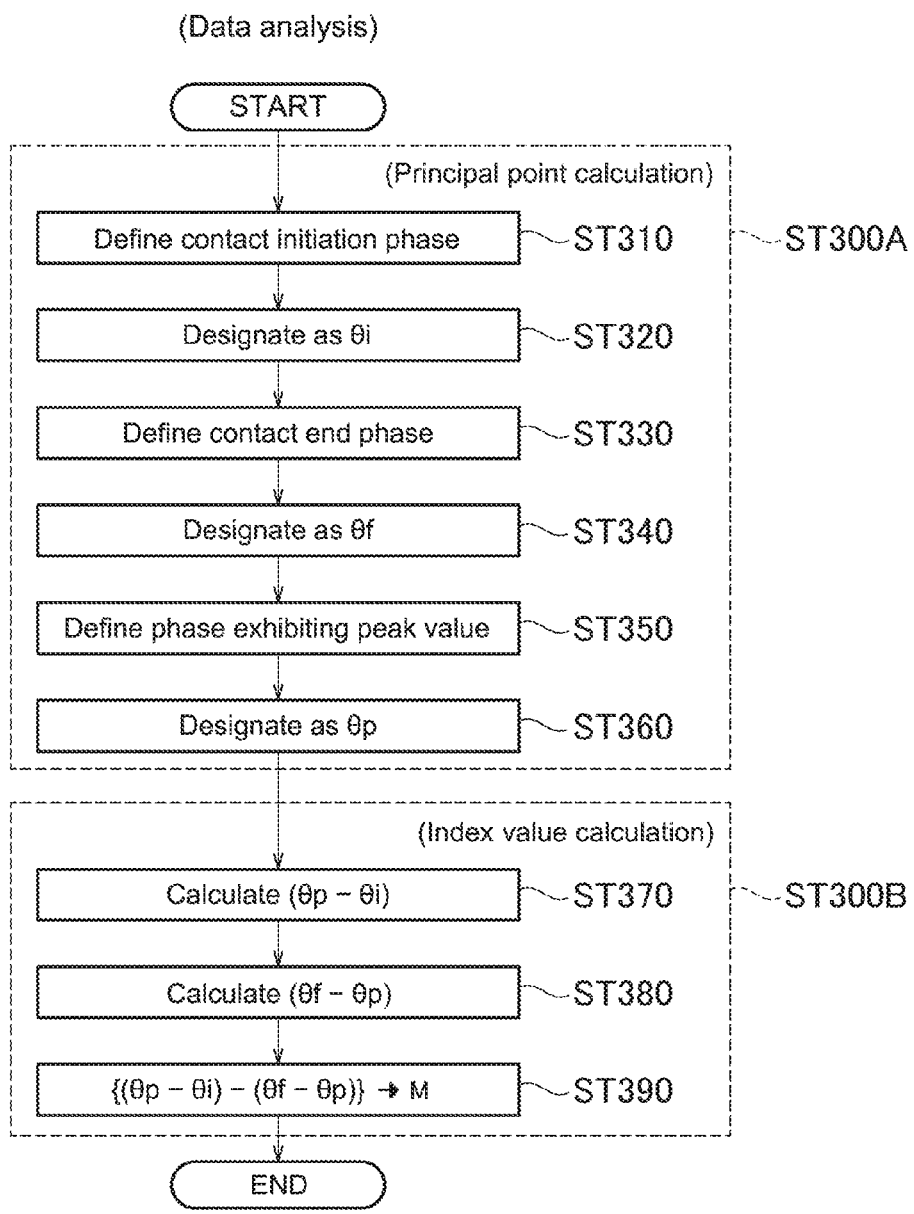
FIG. 5 is a flow chart illustrating a procedure of the method of aligning the measurement axis of the roundness measuring device.
Figure 6:
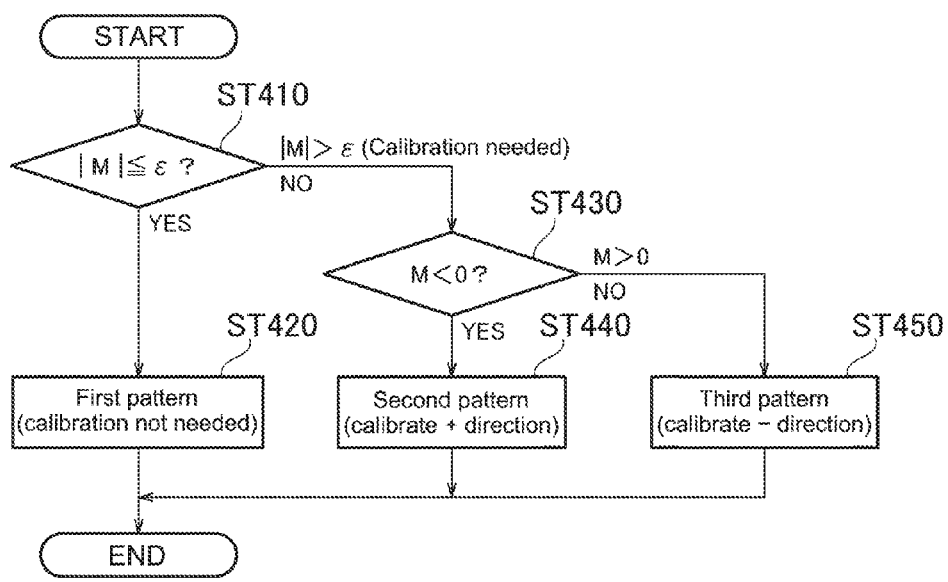
FIG. 6 is a flow chart illustrating a procedure of the method of aligning the measurement axis of the roundness measuring device.

A first embodiment is described for a calibration method of a form measuring device (roundness measuring device 100). FIGS. 4, 5, and 6 are flow charts illustrating a procedure of the calibration method according to the present embodiment. The description follows the order of the flow charts.

Figure 7:
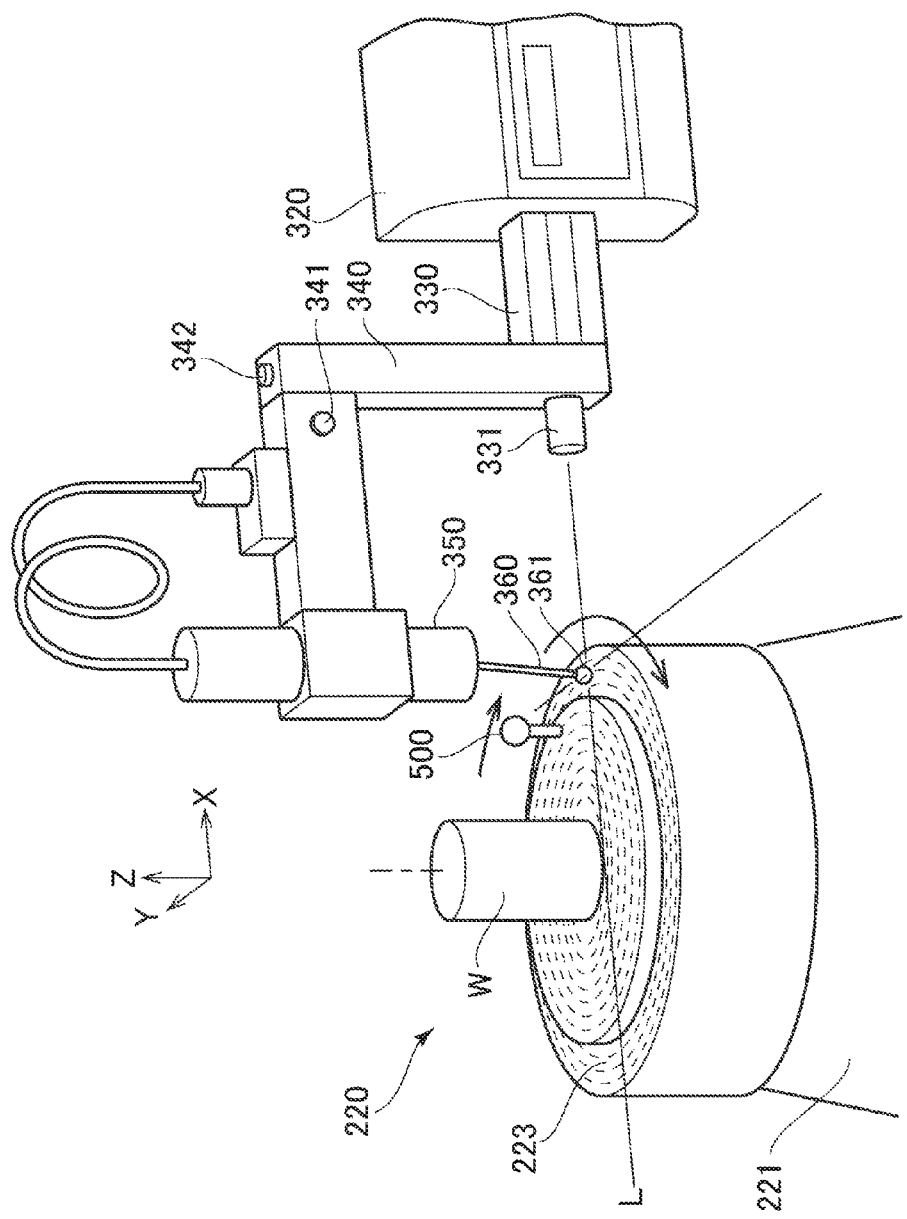
FIG. 7 illustrates a state where a calibration gauge is set on a rotary table.

When performing alignment of a measurement axis of the roundness measuring device 100, first a calibration gauge 500 is set on a rotary table 220 (ST100). FIG. 7 illustrates a state where the calibration gauge 500 is set on the rotary table 220. The calibration gauge 500 is what is referred to as a master ball, having a spherical tip. A position where the calibration gauge 500 is set may be any position other than a center of the rotary table 220. Preferably, a distance from the center of the rotary table 220 is as great as possible. For example, the calibration gauge 500 may be set in an area near an edge of the rotary table 220.

A threaded hole or the like for setting the calibration gauge 500 on a placement stage 223 of the rotary table 220 may also be provided ahead of time.

Because the position where the calibration gauge 500 is set is outside the center of the rotary table 220, a measured object W may remain in the center of the rotary table 220, as shown in FIG. 7. In other words, when aligning the measurement axis, there is no need to remove the measured object W from the rotary table 220. Even in cases where a stylus 360 is swapped out in the middle of measuring the measured object W, or where an angle of the stylus 360 or an angle of a head holder 340 is changed, for example, the measured object W may remain in place and the calibration gauge 500 may be set in an unoccupied area of the rotary table 220. (Therefore, there is no need to re-center the rotary table 220 and the measured object W after aligning the measurement axis.)

Once the calibration gauge 500 is set on the rotary table 220, the calibration gauge 500 is "measured" (ST200).

Figure 2:
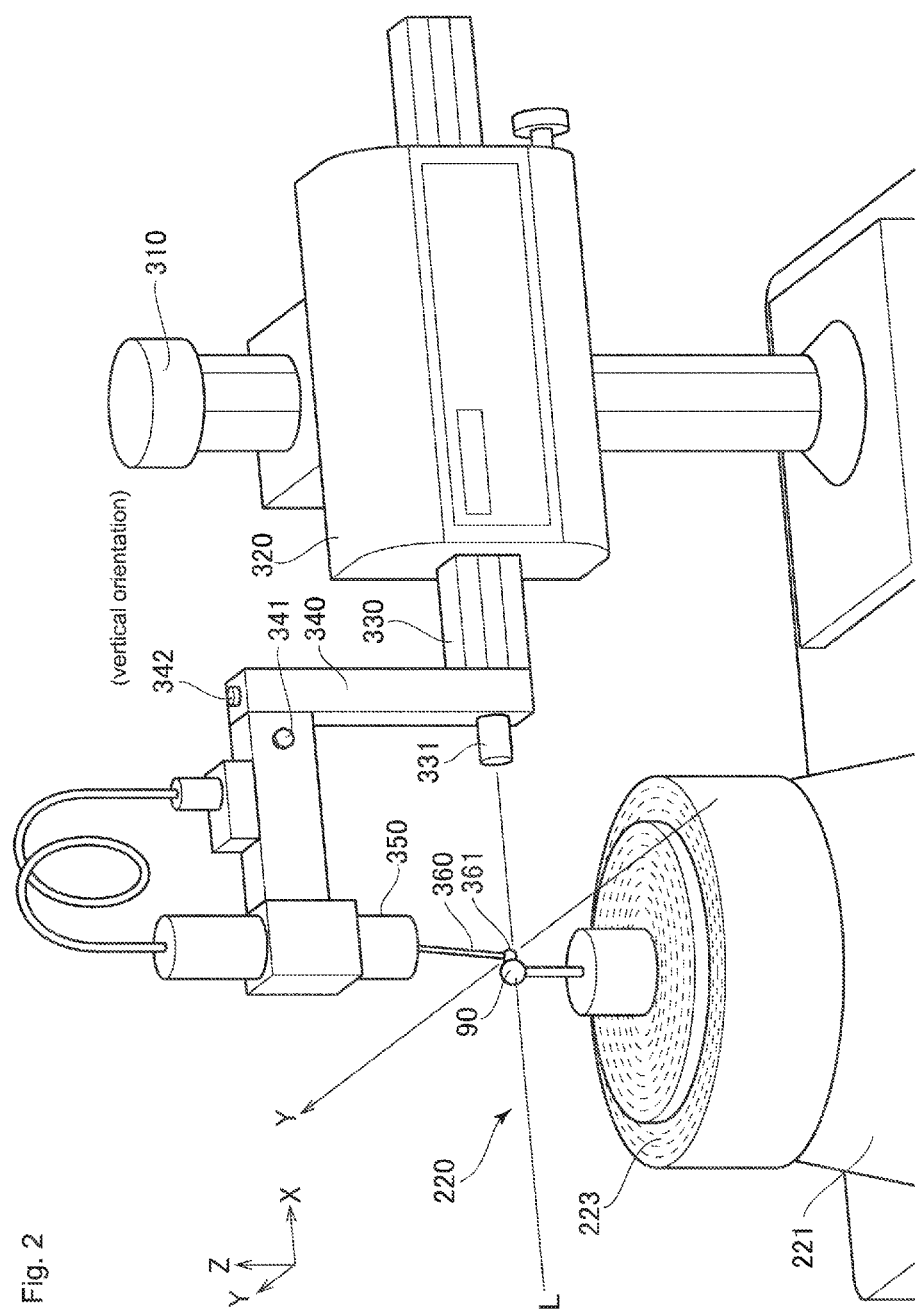
FIG. 2 illustrates a vertical orientation.
Figure 3:
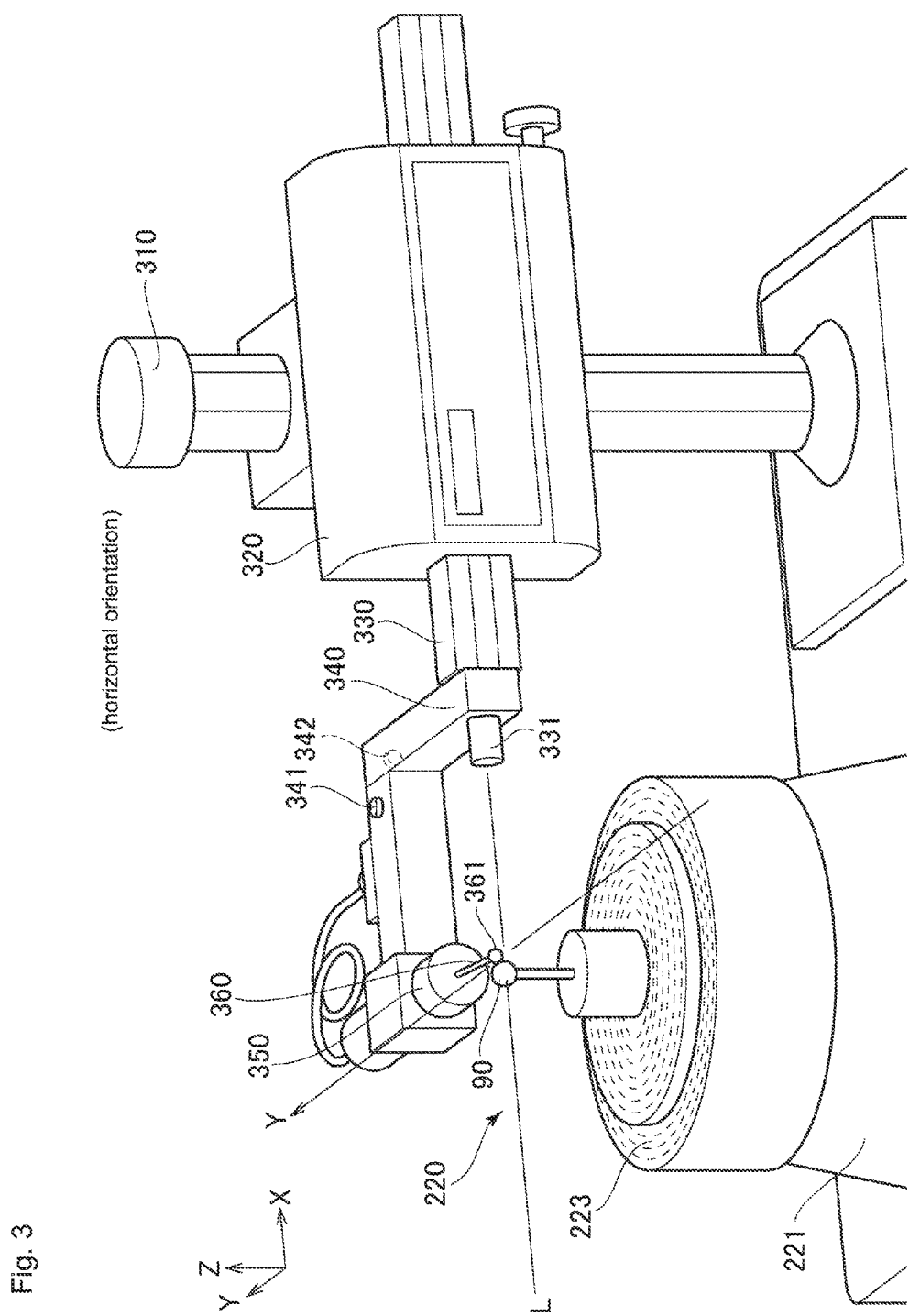
FIG. 3 illustrates a horizontal orientation.

To digress at some length, additional remarks are here directed to terminology. Although it is stated that "the calibration gauge 500 is 'measured' (ST200)," this does not mean that an operator wishes to acquire accurate form data of the calibration gauge 500. Were accurate form data for the calibration gauge 500 itself desired, the calibration gauge 500 would need to be set in the center of the rotary table 220, as shown in FIGS. 2 and 3. In this example, the calibration gauge 500 is set outside the center of the rotary table 220, and therefore form data for the calibration gauge 500 cannot be obtained.

In the present embodiment, a stylus head 361 is made to profile and scan the calibration gauge 500, which is positioned away from the center of the rotary table 220, and offset in the measurement axis L is calculated by inference using a manner of contact between the stylus head 361 and the calibration gauge 500 during the scanning. An action where the "stylus head 361 is made to profile and scan the calibration gauge 500, which is positioned away from the center of the rotary table 220" and an action where the measured object set in the center of the rotary table 220 is measured are identical actions in that the "stylus head 361 is made to profile and scan an object on the rotary table 220 while the rotary table 220 is rotated." In fact, operation control to "measure" the calibration gauge 500 (ST200) may be the same as a parts program for measuring the measured object. Accordingly, as a matter of convenience, the action where the "stylus head 361 is made to profile and scan the calibration gauge 500, which is positioned away from the center of the rotary table 220" is also referred to as "measurement."

In this example, as a first pattern, a case is considered in which the measurement axis L is already aligned. (The measurement axis L being aligned signifies that a rotation axis of the rotary table 220 and the measurement axis L of the stylus head 361 intersect at right angles on the same plane. This definition is carried forward throughout.) FIGS. 8 to 14 illustrate exemplary operations in a case where the measurement axis L is already aligned. In the state shown in FIG. 8, the measurement axis L runs through the center of the rotary table 220; in other words, the measurement axis L is already aligned. (Therefore, there is no need to calibrate the measurement axis L. However, a user cannot tell whether the measurement axis L is aligned.)

Figure 8:
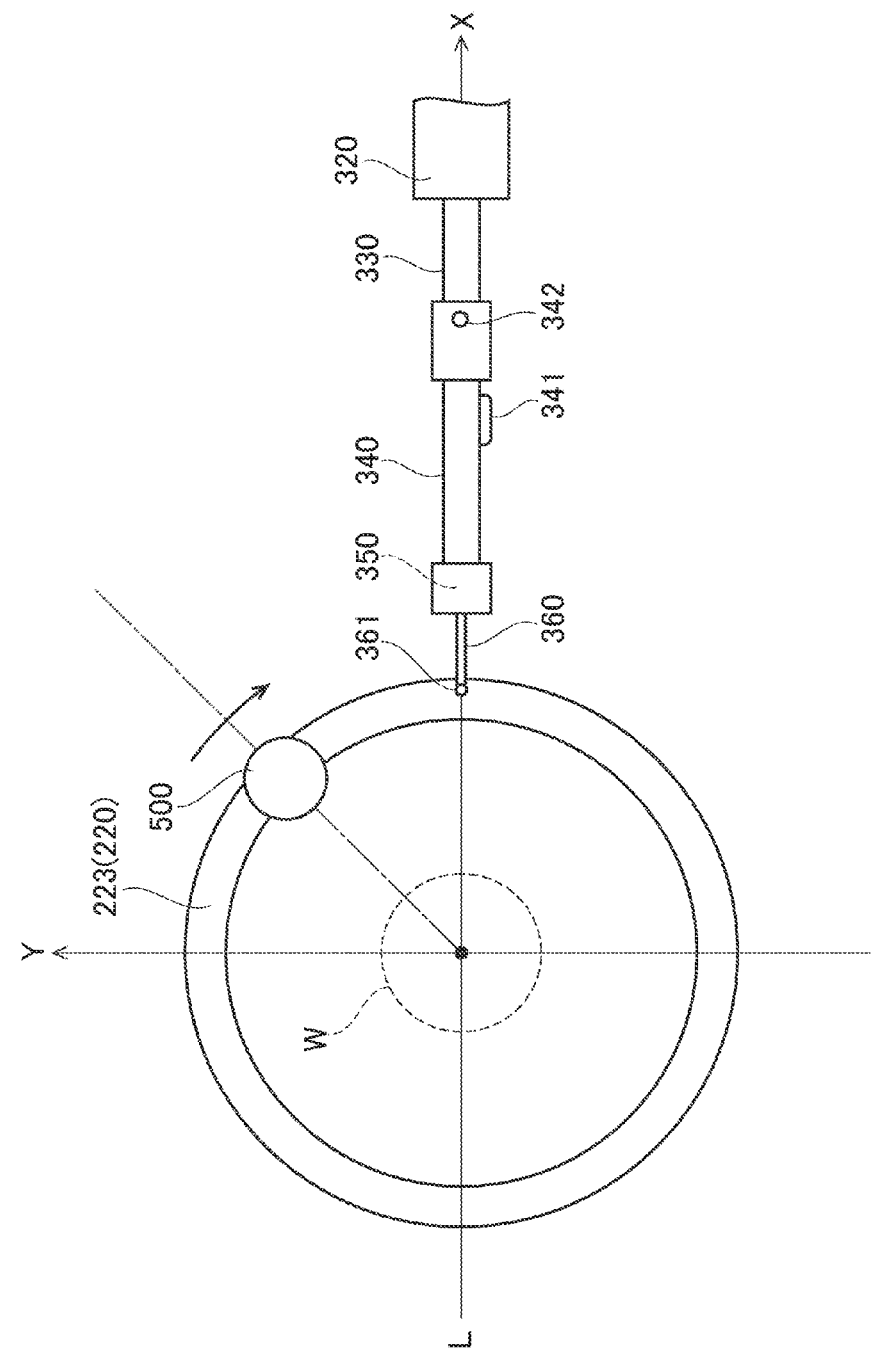
FIG. 8 illustrates an exemplary operation in a case where a measurement axis is already aligned.

First, as shown in FIG. 8, the calibration gauge 500 is assumed to be set in a position away from the center of the rotary table 220. Then measurement of the calibration gauge 500 is initiated. The measurement operation itself can be executed by a measurement parts program preset on the roundness measuring device 100 (host computer 110). The rotary table 220 rotates from the state shown in FIG. 8. (In this example, rotation occurs in a clockwise direction in the drawings.) In the state shown in FIG. 9, even when the stylus head 361 advances and retreats along the measurement axis L, the stylus head 361 does not make contact with the calibration gauge 500.

Figure 9:
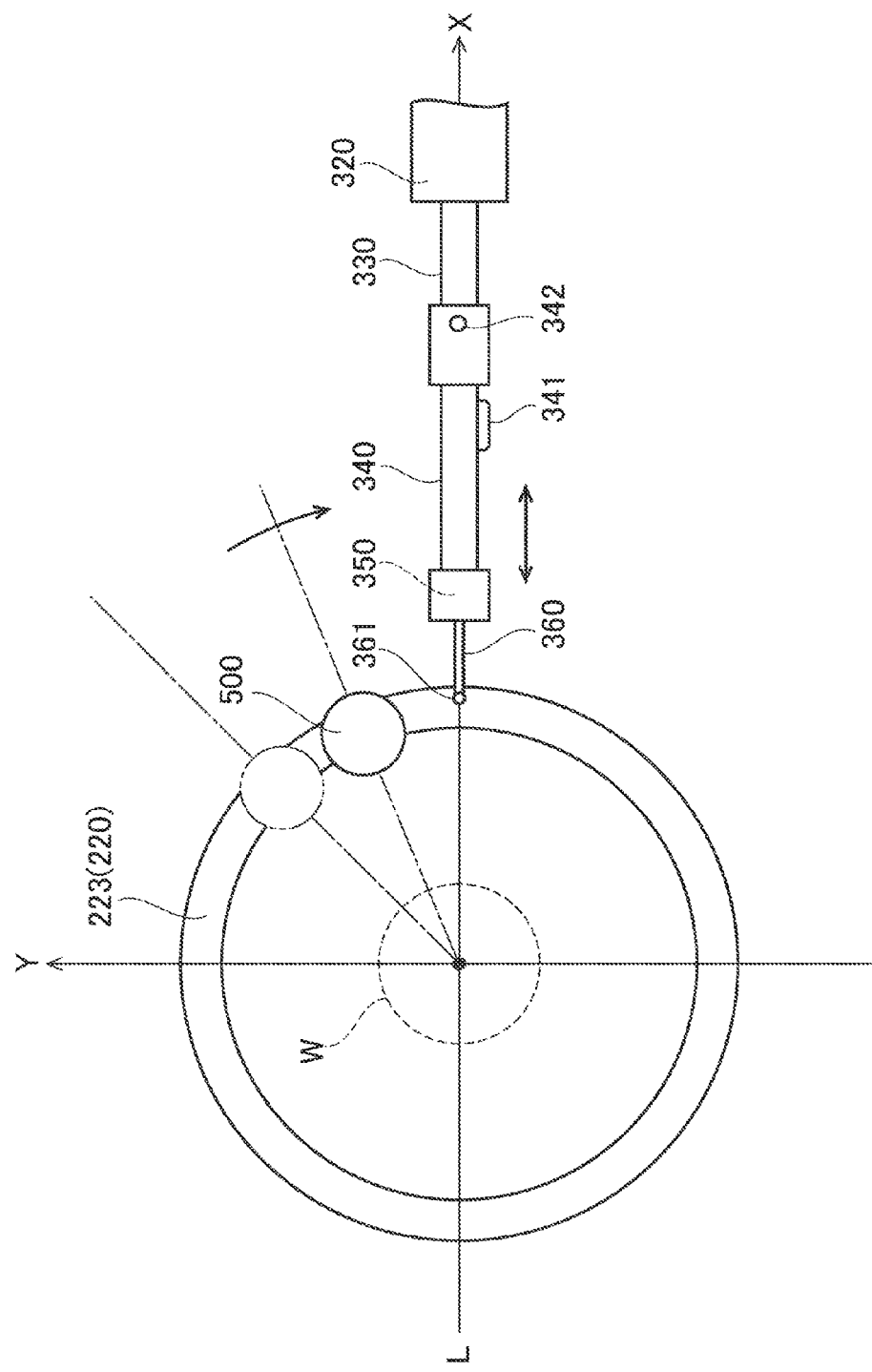
FIG. 9 illustrates an exemplary operation in a case where the measurement axis is already aligned.
Figure 10:
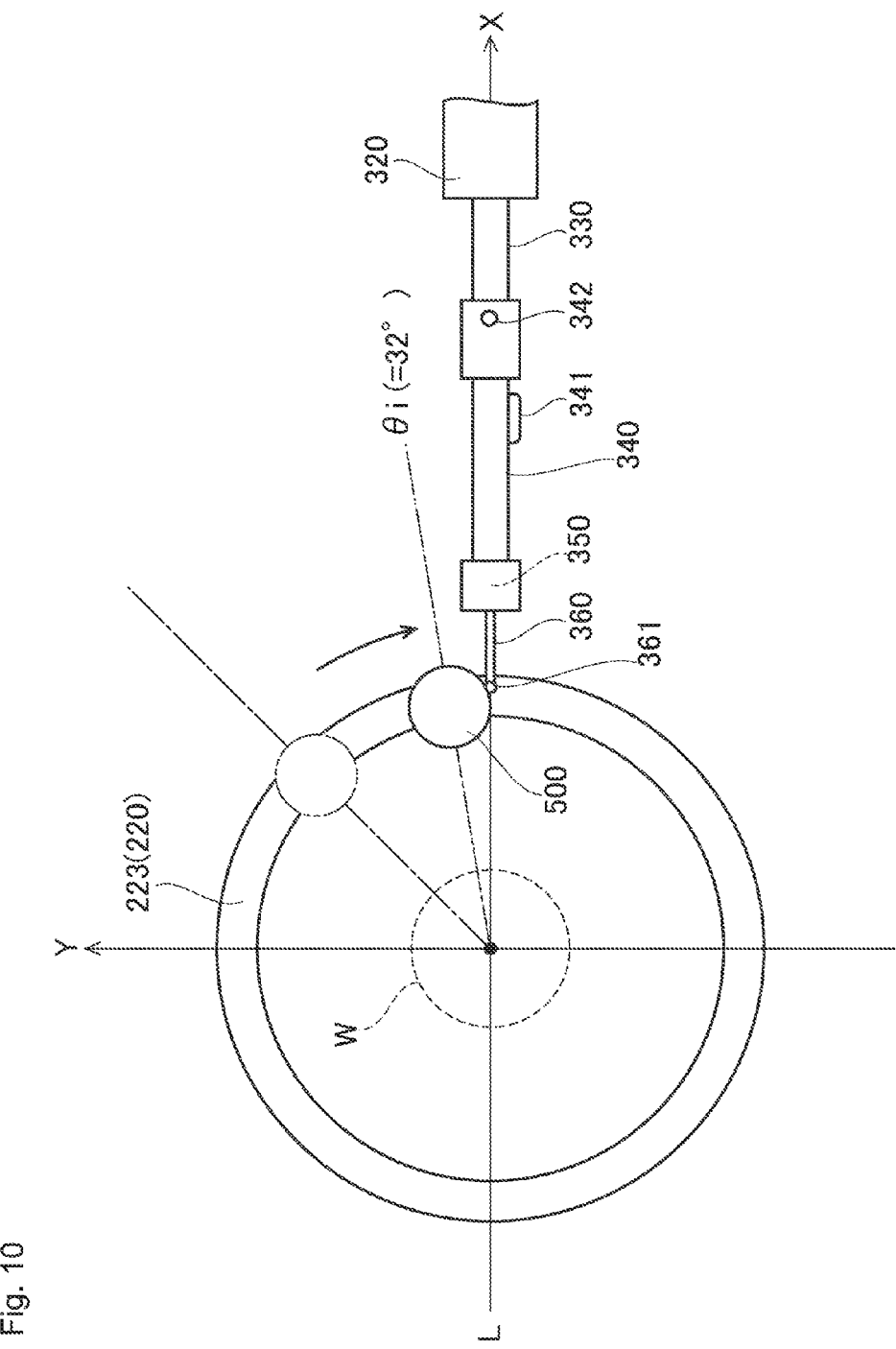
FIG. 10 illustrates an exemplary operation in a case where the measurement axis is already aligned.

When rotation advances further than the state shown in FIG. 9, as shown in FIG. 10, an exterior surface of the calibration gauge 500 makes contact with the stylus head 361. A phase of the rotary table 220 at the point in time where contact between the stylus head 361 and the calibration gauge 500 is initiated is designated θi. Herein, as an example, θi=32°.

When the stylus head 361 makes contact with the exterior surface of the calibration gauge 500, measurement data is obtained which pairs a coordinate value (specifically, an X coordinate value) of the stylus head 361 with the phase of the rotary table 220.

Figure 11:
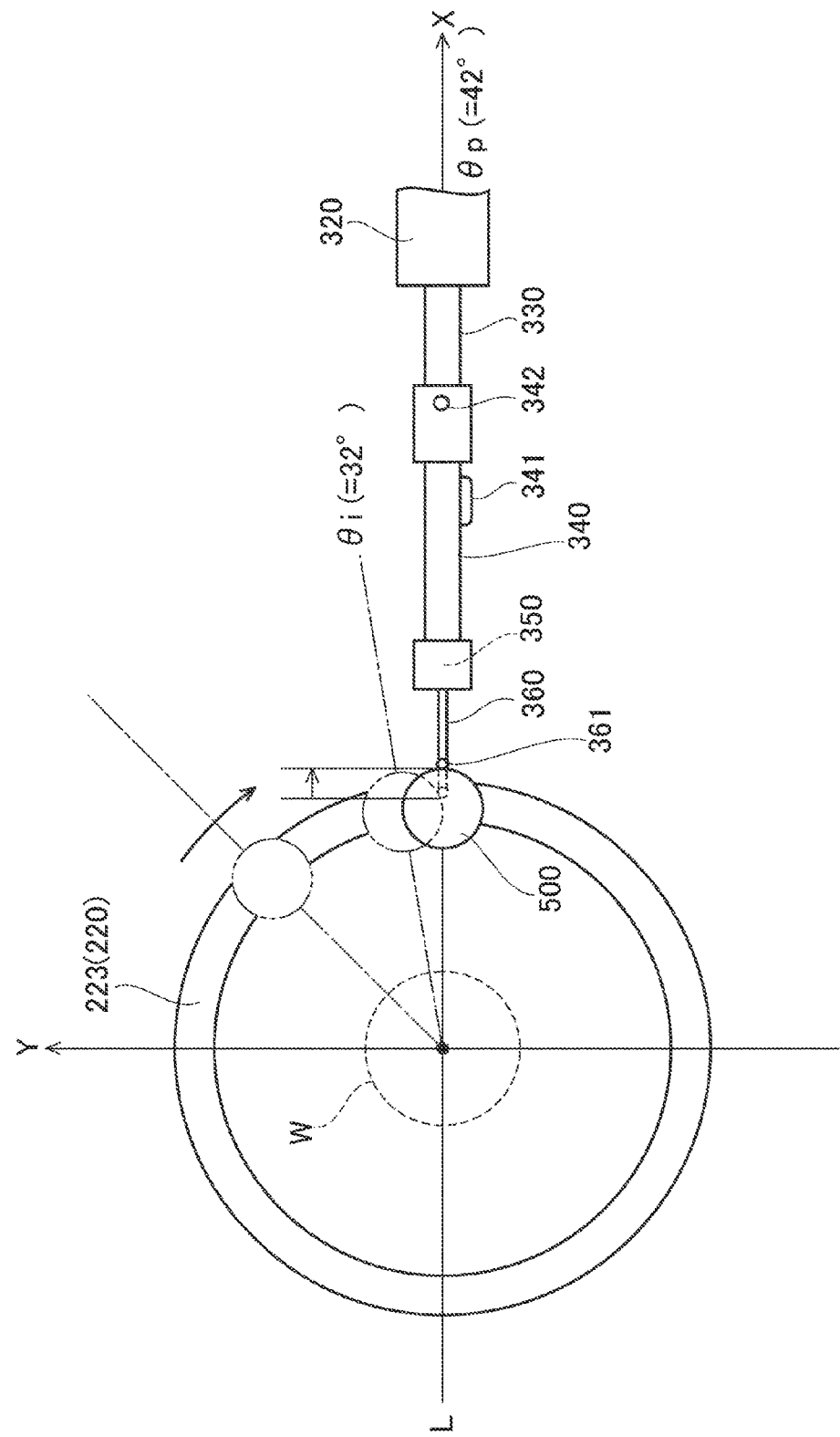
FIG. 11 illustrates an exemplary operation in a case where the measurement axis is already aligned.

When the rotary table 220 rotates further, the stylus head 361 profiles and scans the exterior surface of the calibration gauge 500. In this example, pressed by the exterior surface of the calibration gauge 500, the stylus head 361 is likely to displace in a positive direction on an X axis. FIG. 11 illustrates a state where the stylus head 361 has maximally displaced in the positive direction of the X axis. A measured value at a time when the stylus head 361 has maximally displaced in the positive direction of the X axis is designated a "peak value." Furthermore, the phase of the rotary table 220 when the peak value is exhibited is designated θp. Herein, as an example, θp=42°.

Figure 12:
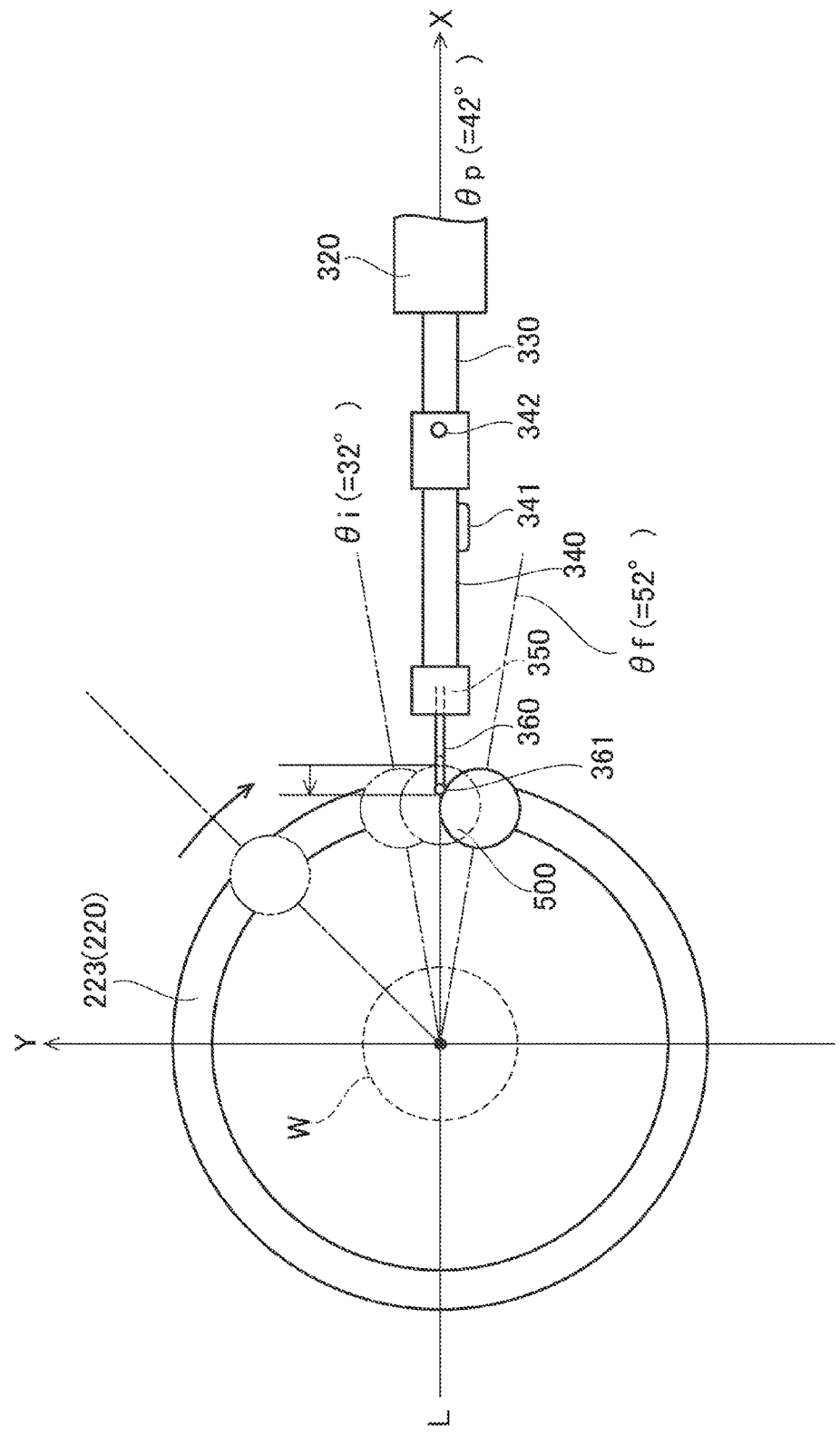
FIG. 12 illustrates an exemplary operation in a case where the measurement axis is already aligned.
Figure 13:
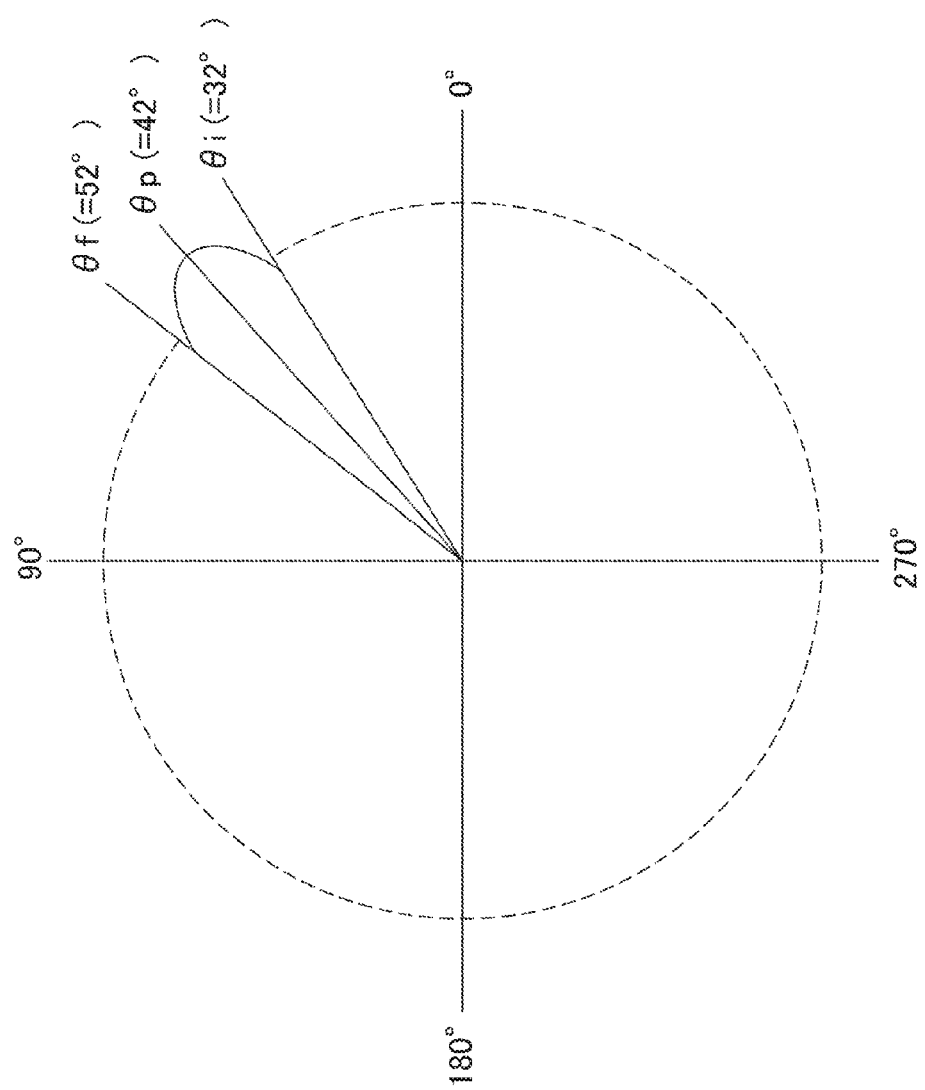
FIG. 13 illustrates an exemplary operation in a case where the measurement axis is already aligned.

After the peak value, when the rotary table 220 is further rotated, the stylus head 361 displaces in the negative direction of the X axis while profiling and scanning the exterior surface of the calibration gauge 500. However, when the rotation of the rotary table 220 advances, the calibration gauge 500 at last moves away from the stylus head 361. (The calibration gauge 500 passes the measurement axis L, and no longer intersects with the measurement axis L.) FIG. 12 illustrates a state immediately prior to the stylus head 361 moving away from the calibration gauge 500. A phase of the rotary table 220 at the point in time where contact between the stylus head 361 and the calibration gauge 500 ends is designated θf. Herein, as an example, θf=52°.

Thereafter, even when the rotary table 220 rotates, the stylus head 361 and the calibration gauge 500 do not make contact, and the measurement (ST200) may conclude with the stylus head 361 away from the calibration gauge 500. In this way, measurement data is obtained which pairs a coordinate value (specifically, an X coordinate value) of the stylus head 361 with the phase of the rotary table 220.

Once the measurement data of the calibration gauge 500 is obtained in this way, analysis of the measurement data is performed next (ST300). A data analysis process (ST300) is executed by the host computer 110. FIG. 5 is a flow chart illustrating a data analysis procedure. The data analysis includes a principal point calculation process ST300A and an index value calculation process ST300B.

First, the description begins with the principal point calculation process ST300A. Principal point refers to θi, θp, and θf, described above. θi is the phase of the rotary table 220 at the point in time when contact between the stylus head 361 and the calibration gauge 500 is initiated. θi is referred to as a contact initiation phase (detection initiation phase). θp is the phase of the rotary table 220 when the peak value is exhibited. θp is referred to as a peak phase. θf is the phase of the rotary table 220 at the point in time when contact between the stylus head 361 and the calibration gauge 500 is ends. θf is referred to as a contact end phase (detection end phase).

The host computer 110 analyzes the measurement data and defines the contact initiation phase θi, the peak phase θp, and the contact end phase θf. In the present example, mapping the measurement data to an XY plane returns a diagram such as that shown in FIG. 13. Obtaining measurement data begins when a rotation angle of the rotary table 220 is 32° (ST310) and ends when the rotation angle is 52° (ST330). Accordingly, the contact initiation phase θi=32° (ST320) and the contact end phase θf=52° (ST340).

In addition, when searching for the peak value, the stylus head 361 maximally displaces in the positive direction of the X axis when the rotation angle of the rotary table 220 is 42° (ST350), and therefore the peak phase θp=42° (ST360).

Continuing from the calculation of the principal points (θi, θp, and θf) (ST300A), an axis offset index value M is calculated (ST300B). The axis offset index value M is a value corresponding to a difference between the rotation angle from the contact initiation phase θi to the peak phase θp, and the rotation angle from the peak phase θp to the contact end phase θf.

The rotation angle from the contact initiation phase θi to the peak phase θp, i.e., (θp−θi), is found (ST370). In this example, 42°−32°=10°. Next, the rotation angle from the peak phase θp to the contact end phase θf, i.e., (θf−θp), is found (ST380). In this example, 52°−42°=10°. Then, {(θp−θi)−(θf−θp)}=M (ST390). In this example, M=10°−10°=0°. When the axis offset index value M has been found, data analysis is complete.

Next, pattern determination is performed (ST400). A pattern determination process (ST400) is executed by the host computer 110. In the pattern determination (ST400), a relative positional relationship between the rotation center and the measurement axis L is determined based on the value of the axis offset index value M. FIG. 6 is a flow chart illustrating a pattern determination (ST400) procedure.

The host computer 110 first compares the absolute value |M| of the axis offset index value M with a predetermined threshold value ϵ (ST410). When the absolute value |M| of the axis offset index value M is equal to or less than the predetermined threshold value ϵ (ST410: YES), the measurement axis L is determined to pass sufficiently close to the rotation center of the rotary table 220 and calibration of the measurement axis alignment is determined to be correct and complete (ST420).

In a case where the measurement axis L passes close to the rotation center of the rotary table 220, even when the calibration gauge 500 is measured with the calibration gauge 500 positioned away from the rotation center of the rotary table 220, due to geometric symmetry of the calibration gauge 500 itself, the contact initiation phase θi and contact end phase θf should display symmetry with the peak phase θp therebetween. Accordingly, when the axis offset index value M is equal to or less than the predetermined threshold value ϵ, the measurement axis L can be determined to pass close to the rotation center of the rotary table 220. A pattern where the axis offset index value M is equal to or less than a given predetermined threshold value ϵ and calibration of the measurement axis L is unnecessary is designated as the first pattern.

The value of the threshold value ϵ is not particularly limited, but is preferably defined as a numerical value of 1° or less, for example.

Figure 14:
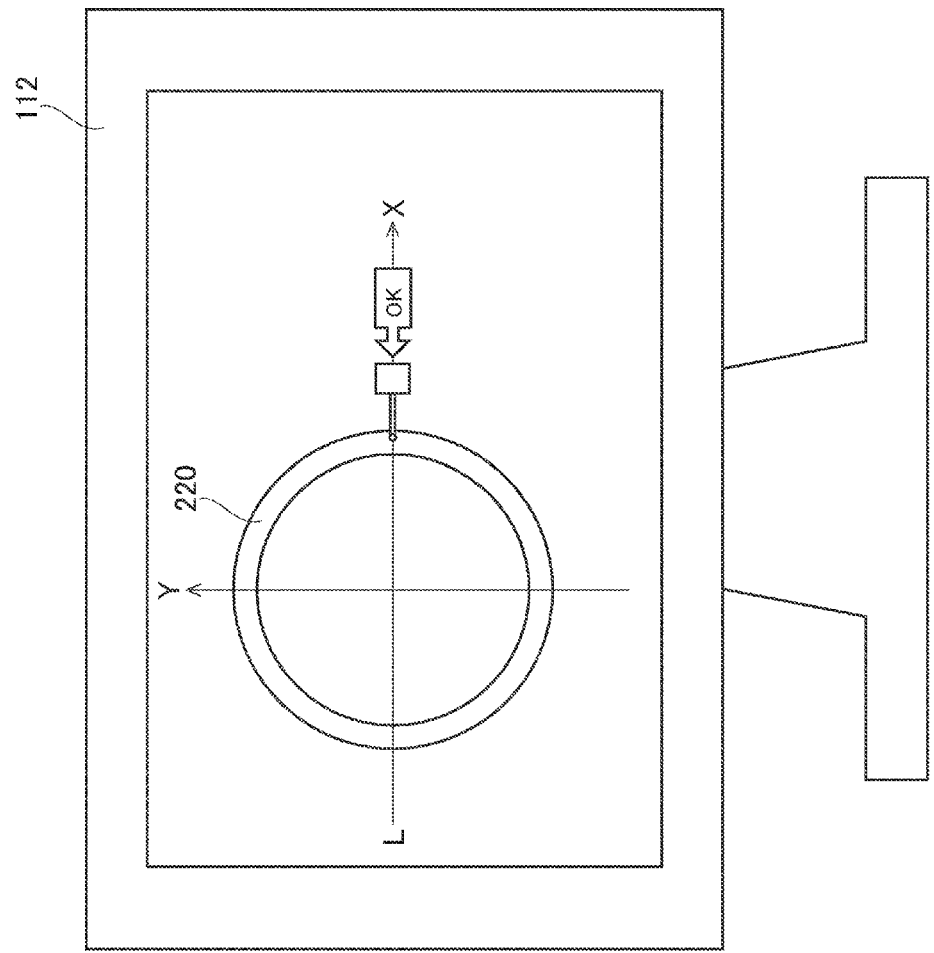
FIG. 14 illustrates an exemplary operation in a case where the measurement axis is already aligned.

Next, the host computer 110 informs the user of the first pattern, i.e., that measurement axis alignment is correct (ST500). Methods of informing the user may include audio or voice notification, or printing on paper, but in this example is achieved by providing a guidance display on a monitor 112 (ST500). FIG. 14 illustrates an exemplary guidance display. The measurement axis L is displayed on a monitor screen overlaid on an image of the rotary table 220 and, in the present example, an "OK" symbol is displayed to indicate that measurement axis alignment has been performed successfully.

Once the user looks at the guidance display and confirms that the calibration is "OK" (ST600: YES), the user removes the calibration gauge 500 from the rotary table 220 (ST700) and proceeds with measurement of the measured object W.

Figure 15:
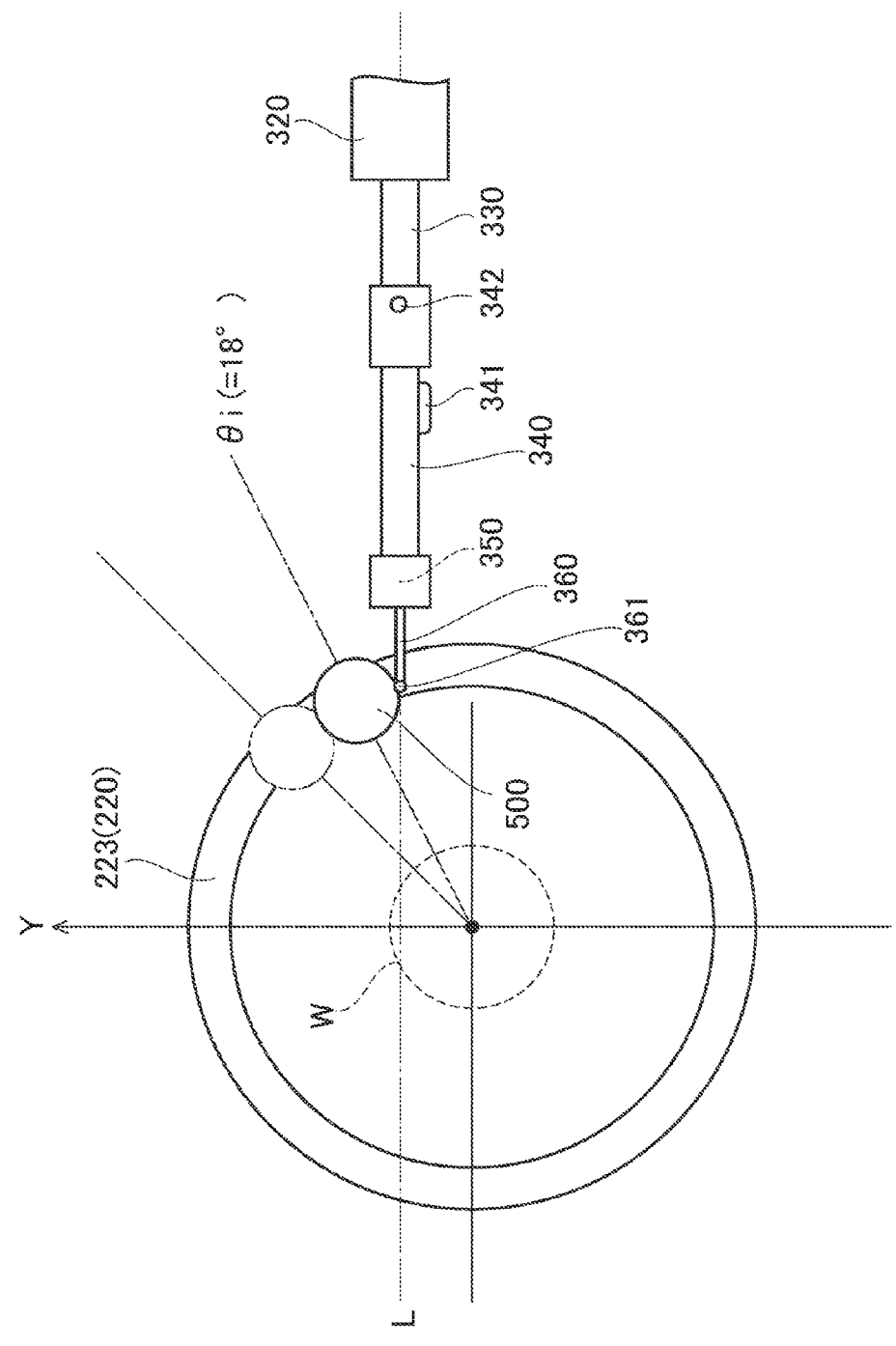
FIG. 15 illustrates an exemplary operation in a case where the measurement axis is offset in a negative Y direction with respect to a rotation axis line of the rotary table.
Figure 16:
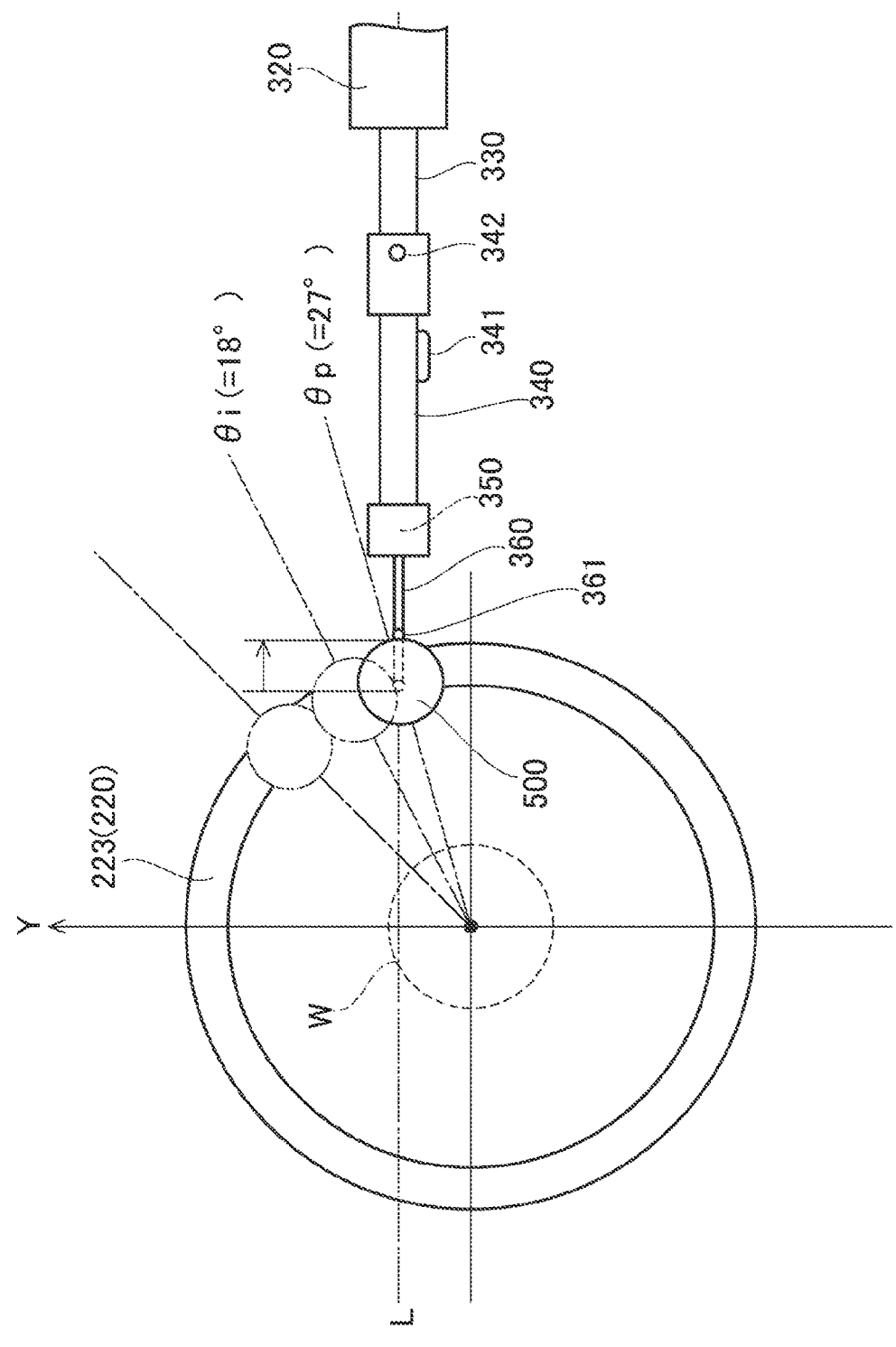
FIG. 16 illustrates an exemplary operation in a case where the measurement axis is offset in the negative Y direction with respect to the rotation axis line of the rotary table.
Figure 17:
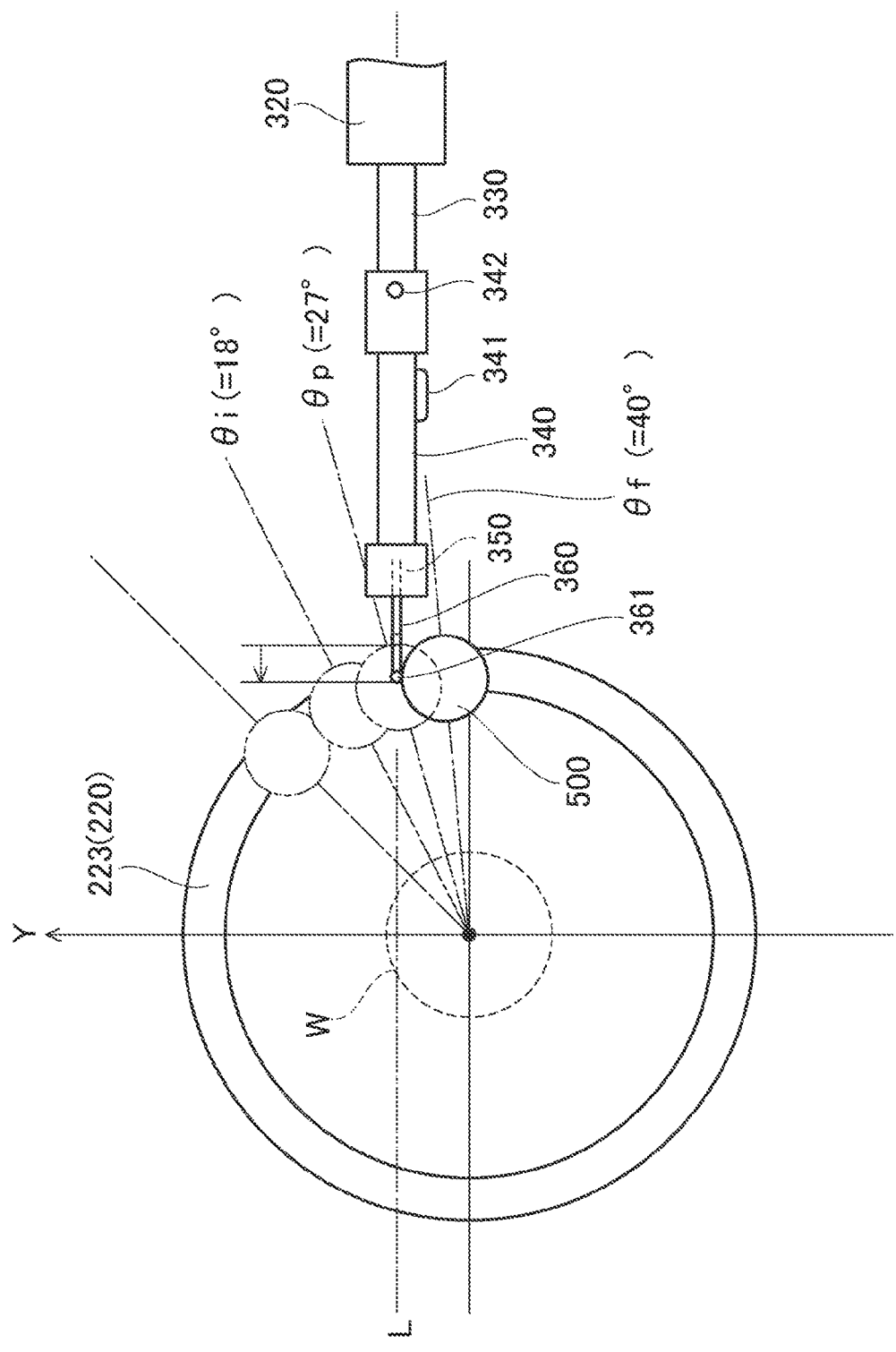
FIG. 17 illustrates an exemplary operation in a case where the measurement axis is offset in the negative Y direction with respect to the rotation axis line of the rotary table.
Figure 18:
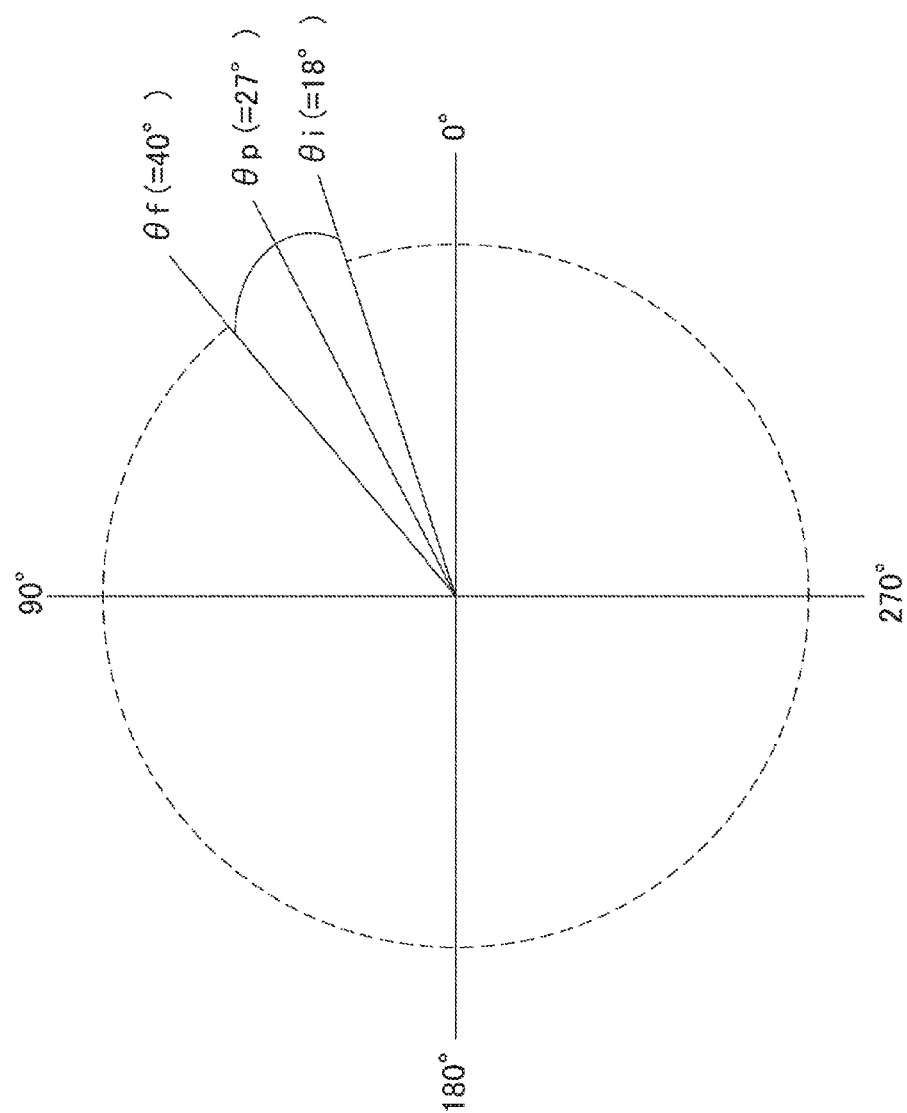
FIG. 18 illustrates an exemplary operation in a case where the measurement axis is offset in the negative Y direction with respect to the rotation axis line of the rotary table.

The example described above is a case where the measurement axis L is already aligned (the measurement axis L passes close to the rotation center of the rotary table 220). Hereafter, a case is described where the measurement axis L is offset. FIGS. 15 to 19 illustrate a case where the measurement axis L is offset in the positive Y direction with respect to the rotation axis line of the rotary table 220. This is designated as a second pattern. Similarly to the above example and as shown in FIG. 15, the calibration gauge 500 is set on the rotary table 220 and the calibration gauge 500 is measured (ST100, ST200). When the rotary table 220 is rotated, the stylus head 361 initiates contact with the calibration gauge 500 (FIG. 15) and, accompanying further rotation of the rotary table 220, the stylus head 361 is pushed by the exterior surface of the calibration gauge 500 and displaces in a positive direction of the X axis (FIG. 16). In addition, when the rotation of the rotary table 220 advances, the stylus head 361 at last moves away from the calibration gauge 500 (FIG. 17). Mapping the measurement data obtained in this way to the XY plane returns a diagram such as that shown in FIG. 18, for example.

In the present example, the measurement axis L is offset in a positive Y direction with respect to the rotation axis line of the rotary table 220, and therefore as compared to the previous example (FIGS. 8 to 14), one may intuitively understand that the contact initiation phase θi, the peak phase θp, and the contact end phase θf all become smaller. Through data analysis (ST300), the contact initiation phase θi, the peak phase θp, and the contact end phase θf are defined (ST310 to ST360). The contact initiation phase θi is given as 18°, the contact end phase θf is given as 40°, and the peak phase θp is given as 27°, as an example.

The axis offset index value M is then calculated. The rotation angle from the contact initiation phase θi to the peak phase θp, i.e., (θp−θi), is found (ST370). In this example, 27°−18°=9°. The rotation angle from the peak phase θp to the contact end phase θf, i.e., (θf−θp), is found (ST380). In this example, 40°−27°=13°. Then, {(θp−θi)−(θf−θp)}=M is found (ST390). In this example, 9°−13°=−4°.

The calibration gauge 500 itself has geometric symmetry; however, due to the measurement axis L being offset, the measurement results may have a distorted shape lacking symmetry. In other words, the contact initiation phase θi and contact end phase θf do not exhibit symmetry with the peak phase θp therebetween. When the measurement axis L is offset in the negative Y direction, the rotation angle from the contact initiation phase θi to the peak phase θp (θp−θi) is smaller than the rotation angle from the peak phase θp to the contact end phase θf (θf−θp). Accordingly, the axis offset index value M is a negative number.

Pattern determination is performed based on the axis offset index value M (ST400). The absolute value |M| of the axis offset index value M is compared with the predetermined threshold value ϵ (ST410). In this example, the absolute value |M| of the axis offset index value M exceeds the predetermined threshold value ϵ (ST410: NO). In a case where the absolute value |M| of the axis offset index value M exceeds the predetermined threshold value ϵ, the sign of the axis offset index value M is checked (ST430). When the value of the axis offset index value M is negative (ST430: YES), the measurement axis L is determined to be offset in the positive Y direction. Accordingly, calibration is required to move the measurement axis L in the negative Y direction (ST440). A pattern requiring calibration to move the measurement axis L in the negative Y direction is designated as the second pattern.

Figure 19:
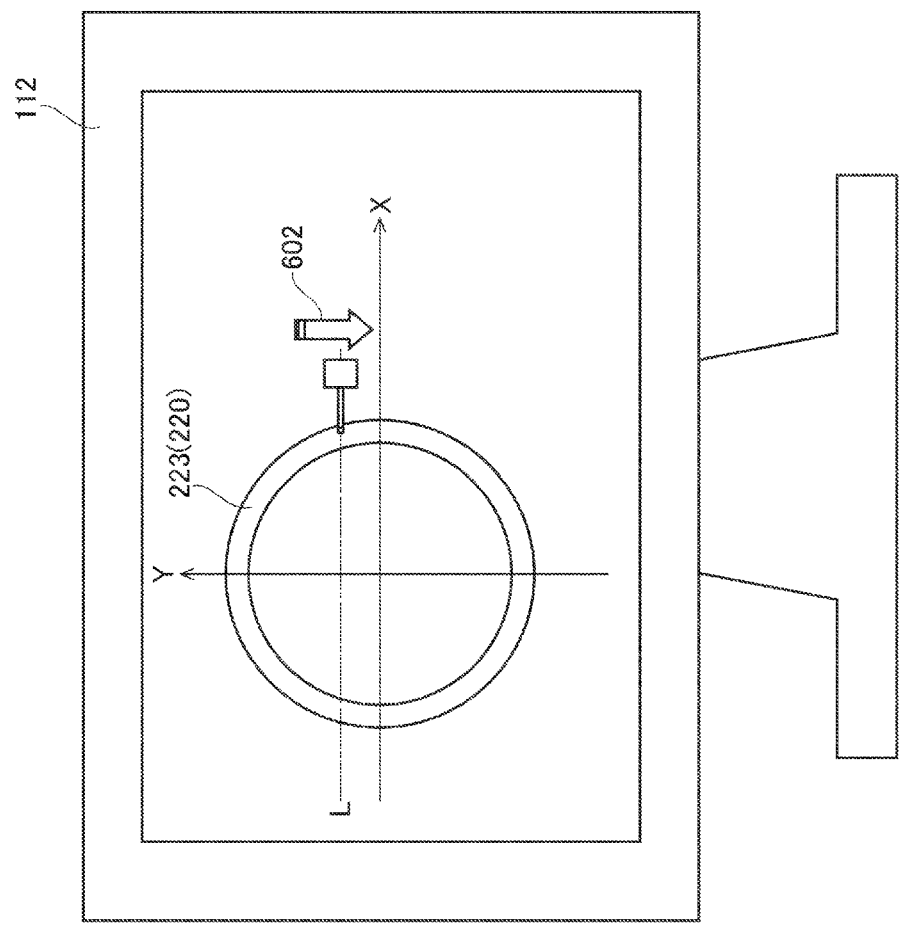
FIG. 19 illustrates an exemplary operation in a case where the measurement axis is offset in the negative Y direction with respect to the rotation axis line of the rotary table.

FIG. 19 illustrates an exemplary guidance display. The measurement axis L is displayed on the monitor screen overlaid on an image of the rotary table 220 and, in the present example, an indication is given that the measurement axis L is offset in the positive Y direction and, together with this, an arrow symbol (602) indicates a direction in which to perform displacement during the calibration.

Once the user looks at the guidance display and confirms that axis alignment calibration is required (ST600: NO), the user displaces the measurement axis L with calibration screws (341 and 342) in accordance with the guidance (ST800). After calibration, ST200 through ST600 are once again executed, and the user confirms that the calibration of the measurement axis L is "OK" (ST600: YES). Thereafter, the user removes the calibration gauge 500 from the rotary table 220 (ST700) and proceeds with measurement of the measured object W.

Figure 20:
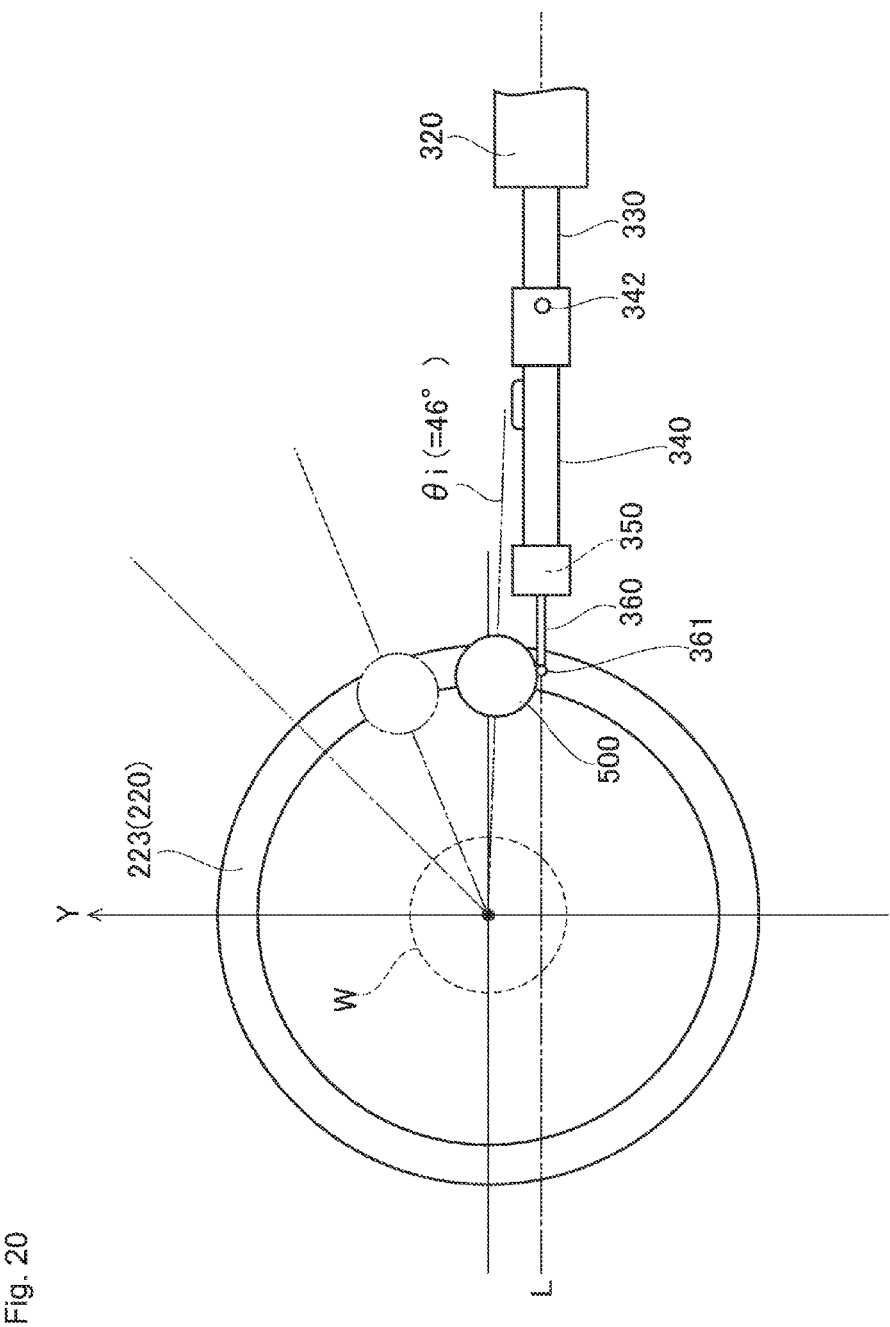
FIG. 20 illustrates an exemplary operation in a case where the measurement axis is offset in a positive Y direction with respect to the rotation axis line of the rotary table.
Figure 21:
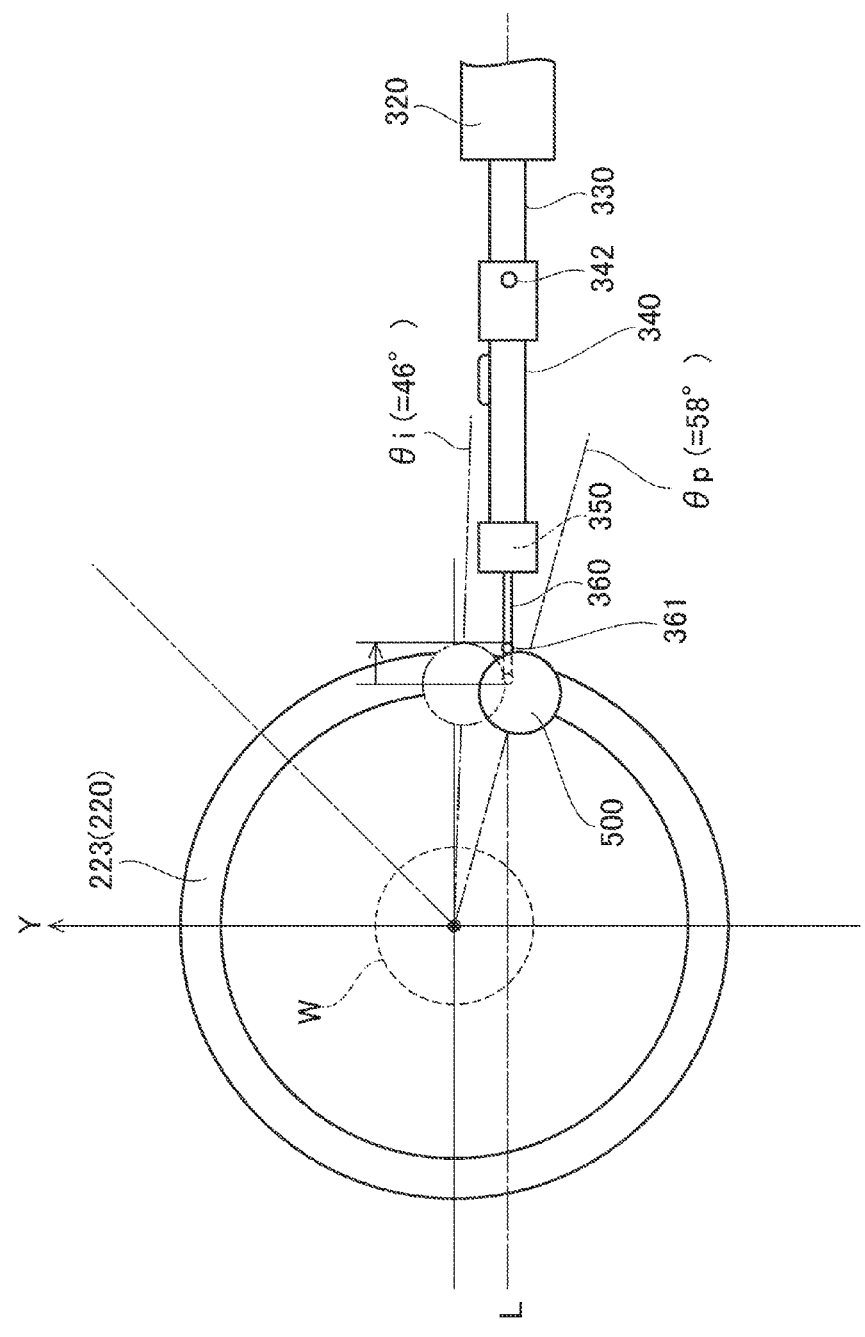
FIG. 21 illustrates an exemplary operation in a case where the measurement axis is offset in the positive Y direction with respect to the rotation axis line of the rotary table.
Figure 22:
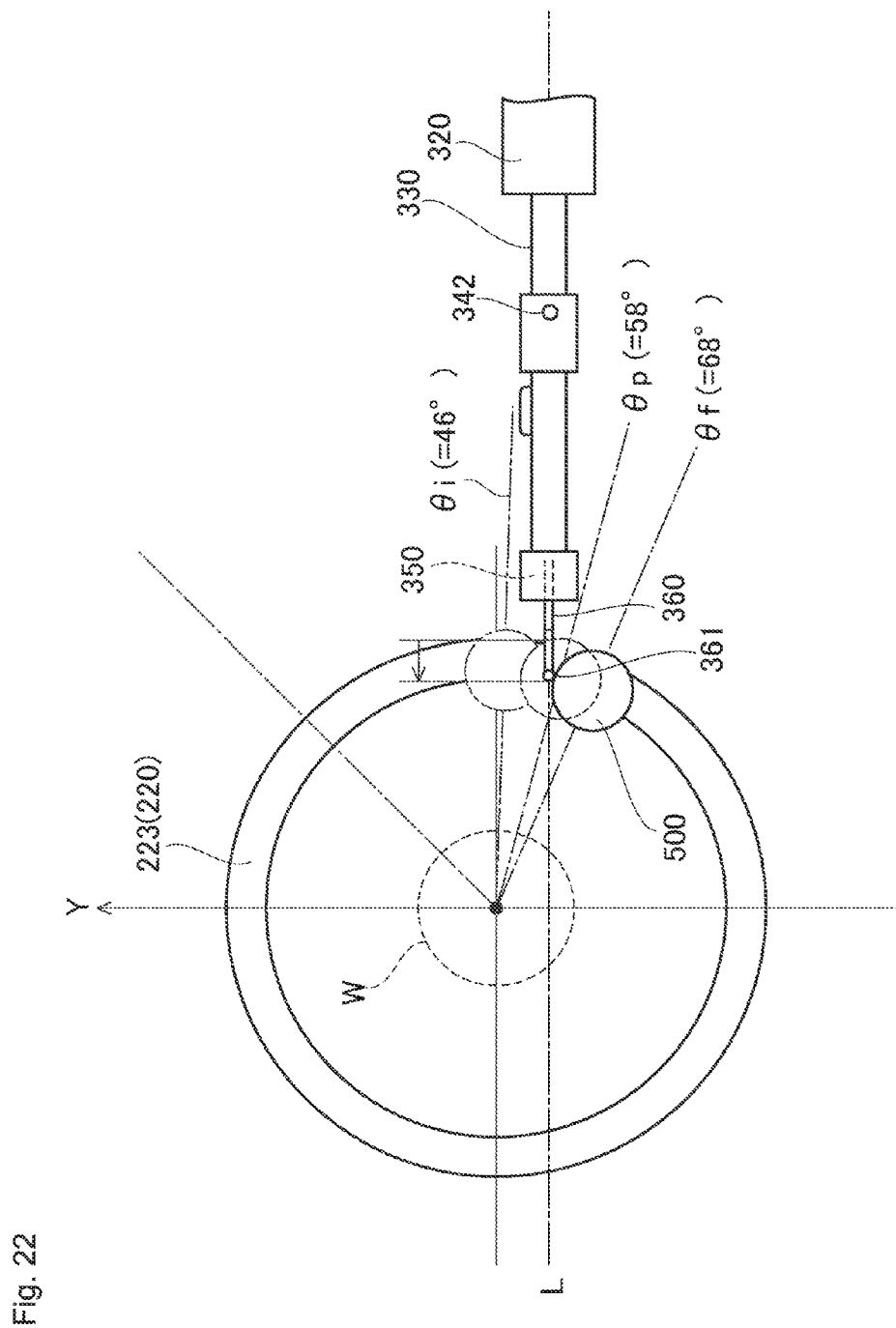
FIG. 22 illustrates an exemplary operation in a case where the measurement axis is offset in the positive Y direction with respect to the rotation axis line of the rotary table.

As a third example, a case is described where the measurement axis L is offset in the negative Y direction with respect to the rotation axis line of the rotary table 220. FIGS. 20 to 24 illustrate a case where the measurement axis L is offset in the negative Y direction with respect to the rotation axis line of the rotary table 220. This is designated as a third pattern. Similarly to the above example and as shown in FIG. 20, the calibration gauge 500 is set on the rotary table 220 and the calibration gauge 500 is measured (ST100, ST200). When the rotary table 220 is rotated, the stylus head 361 initiates contact with the calibration gauge 500 (FIG. 20) and, accompanying further rotation of the rotary table 220, the stylus head 361 is pushed by the exterior surface of the calibration gauge 500 and displaces in a positive direction of the X axis (FIG. 21). In addition, when the rotation of the rotary table 220 advances, the stylus head 361 at last moves away from the calibration gauge 500 (FIG. 22).

Figure 23:
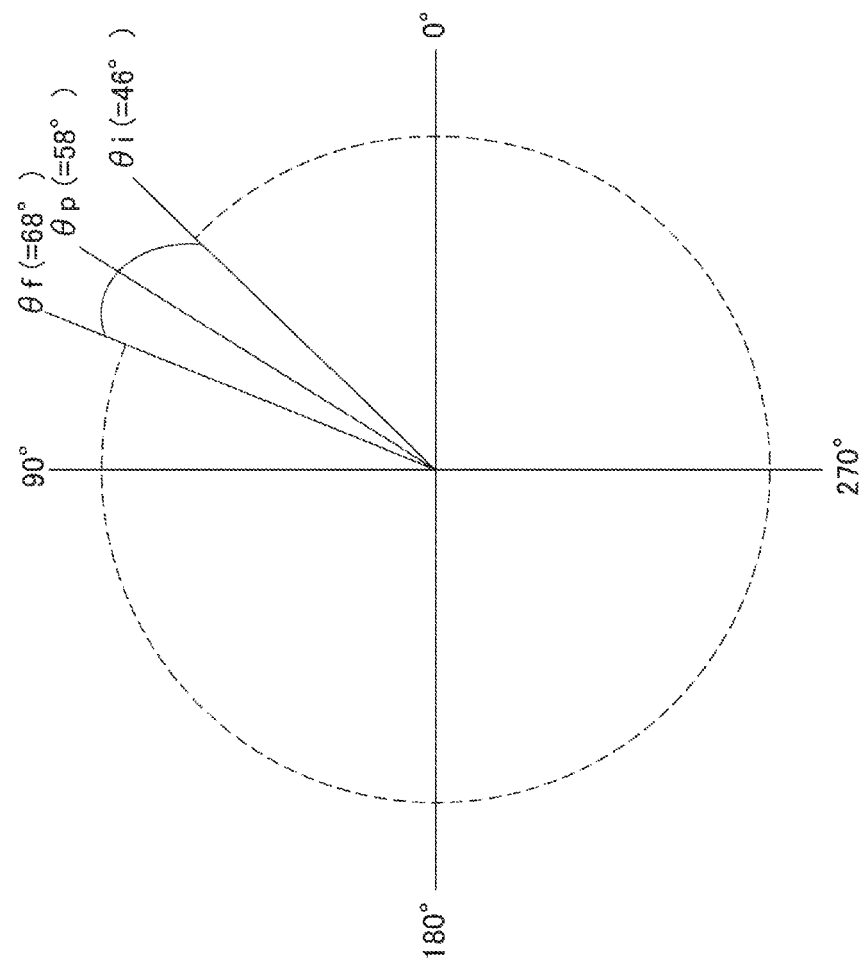
FIG. 23 illustrates an exemplary operation in a case where the measurement axis is offset in the positive Y direction with respect to the rotation axis line of the rotary table.

Mapping the measurement data obtained in this way to the XY plane returns a diagram such as that shown in FIG. 23, for example. In the present example, the measurement axis L is offset in the negative Y direction with respect to the rotation axis line of the rotary table 220, and therefore as compared to the previous example (FIGS. 8 to 14), one may intuitively understand that the contact initiation phase θi, the peak phase θp, and the contact end phase θf all become larger. Through data analysis (ST300), the contact initiation phase θi, the peak phase θp, and the contact end phase θf are defined (ST310 to ST360). The contact initiation phase θi is given as 46°, the contact end phase θf is given as 68°, and the peak phase θp is given as 58°, as an example.

The axis offset index value M is then calculated. The rotation angle from the contact initiation phase θi to the peak phase θp, i.e., (θp−θi), is found (ST370). In this example, 58°−46°=12°. The rotation angle from the peak phase θp to the contact end phase θf, i.e., (θf−θp), is found (ST380). In this example, 68°−58°=10°. Then, {(θp−θi)−(θf−θp)}=M is found (ST390). In this example, M=12°−10°=2°.

Similar to the above-noted example (FIGS. 15 to 19), due to the measurement axis L being offset, the measurement results have a distorted shape lacking symmetry, and the contact initiation phase θi and contact end phase θf do not exhibit symmetry with the peak phase θp therebetween. In this example, in a case where the measurement axis L is offset in the negative Y direction, the rotation angle from the contact initiation phase θi to the peak phase θp (θp−θi) is larger than the rotation angle from the peak phase θp to the contact end phase θf (θf−θp). Accordingly, the axis offset index value M is a positive number.

The absolute value |M| of the axis offset index value M is compared with the predetermined threshold value ε (ST410: NO), then the sign of the axis offset index value M is checked (ST430: NO). When the value of the axis offset index value M is positive (ST430: NO), the measurement axis L is determined to be offset in the negative Y direction (ST450). Accordingly, calibration is required to move the measurement axis L in the positive Y direction (ST450). A pattern requiring calibration to move the measurement axis L in the positive Y direction is designated as the third pattern.

Figure 24:
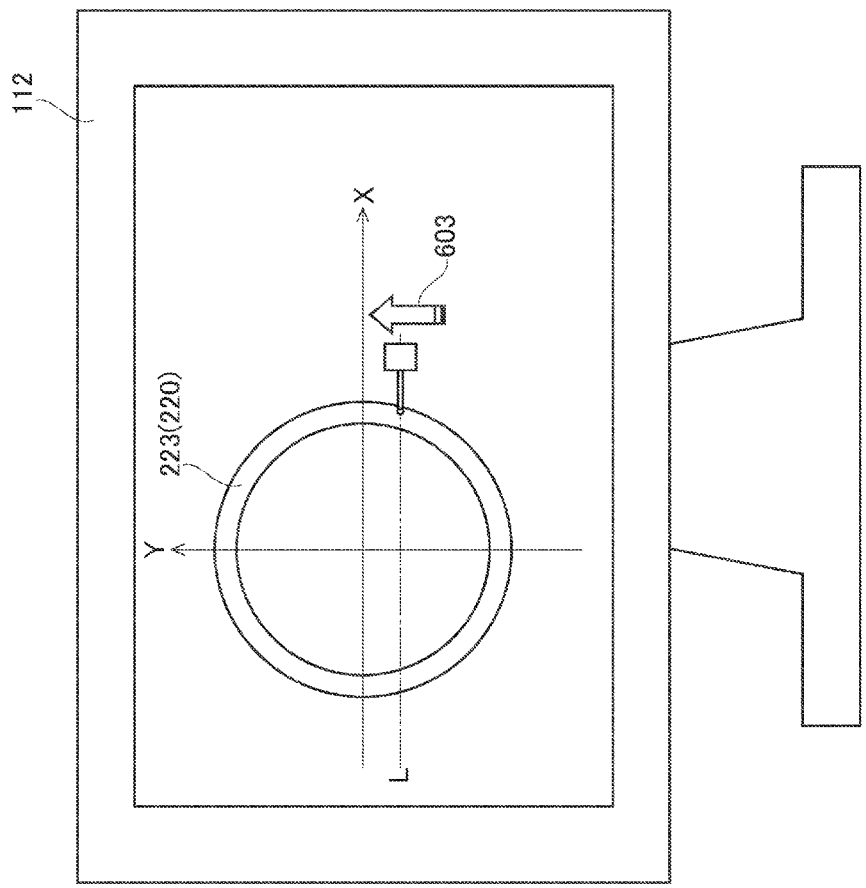
FIG. 24 illustrates an exemplary operation in a case where the measurement axis is offset in the positive Y direction with respect to the rotation axis line of the rotary table.

FIG. 24 illustrates an exemplary guidance display. The measurement axis L is displayed on the monitor screen overlaid on an image of the rotary table 220 and, in the present example, an indication is given that the measurement axis L is offset in the negative Y direction and, together with this, an arrow symbol (603) indicates a direction in which to perform displacement during the calibration.

Once the user looks at the guidance display and confirms that axis alignment calibration is required (ST600: NO), the user displaces the measurement axis L with the calibration screws (341 and 342) in accordance with the guidance (ST800). After calibration, ST200 through ST600 are once again executed, and the user confirms that the calibration of the measurement axis L is "OK" (ST600: YES). Thereafter, the user removes the calibration gauge 500 from the rotary table 220 (ST700) and proceeds with measurement of the measured object W.

The following beneficial effects are achieved with the first embodiment having the above-noted configuration.

(1) In the present embodiment, the calibration gauge 500 is set in a position away from the center of the rotary table 220. In a case where measurement of the measured object W is in the middle of being performed, the measured object W may remain in place and the calibration gauge 500 may be set in an unoccupied area of the rotary table 220. Therefore, even in cases where the stylus 360 is swapped out in the middle of measuring the measured object W, or where the posture of the head holder 340 is changed, there is no need to re-center the rotary table 220 and the measured object W after aligning the measurement axis. This enables an improvement in measurement efficiency. Moreover, swapping out the stylus 360 and changing the posture of the head holder 340 can be performed with simple operations, and therefore the stylus 360 may be swapped out and the posture of the head holder 340 may be purposefully changed in response to a measurement location of the measured object W. Accordingly, convenience as well as measurement accuracy are improved in a measurement task.

(2) In the present embodiment, the calibration gauge 500 may be set in a position away from the center of the rotary table 220, and there is no need to make fine adjustments to the position of calibration gauge 500, for example. Conventionally, the master ball 90 must be set at the center of the rotary table 220, therefore requiring work to center the master ball 90. In this regard, the present embodiment is drastically simplified.

(3) In the present embodiment, a determination is made as to in which direction the measurement axis L is offset, depending on the sign of the axis offset index value M. In addition, an instruction is given to the user on the guidance display as to in which direction the measurement axis L is to be moved. Conventionally, a peak point is located by repeatedly approaching and distancing the stylus head 361 along the Y axis while the stylus head 361 strikes the master ball 90. In this regard, according to the present embodiment, an amount of time required to align the measurement axis can be expected to be significantly reduced.

(4) The present embodiment provides the above-noted innovative results; however, the calibration gauge 500 itself is a master ball 90 or the like, which is well known in the conventional art, and does not require use of a specialized gauge. Accordingly, when employing the present embodiment, few additional costs are necessary, and the present embodiment can be added to an existing roundness measuring device 100 at a low cost.

First Modification

Figure 25:
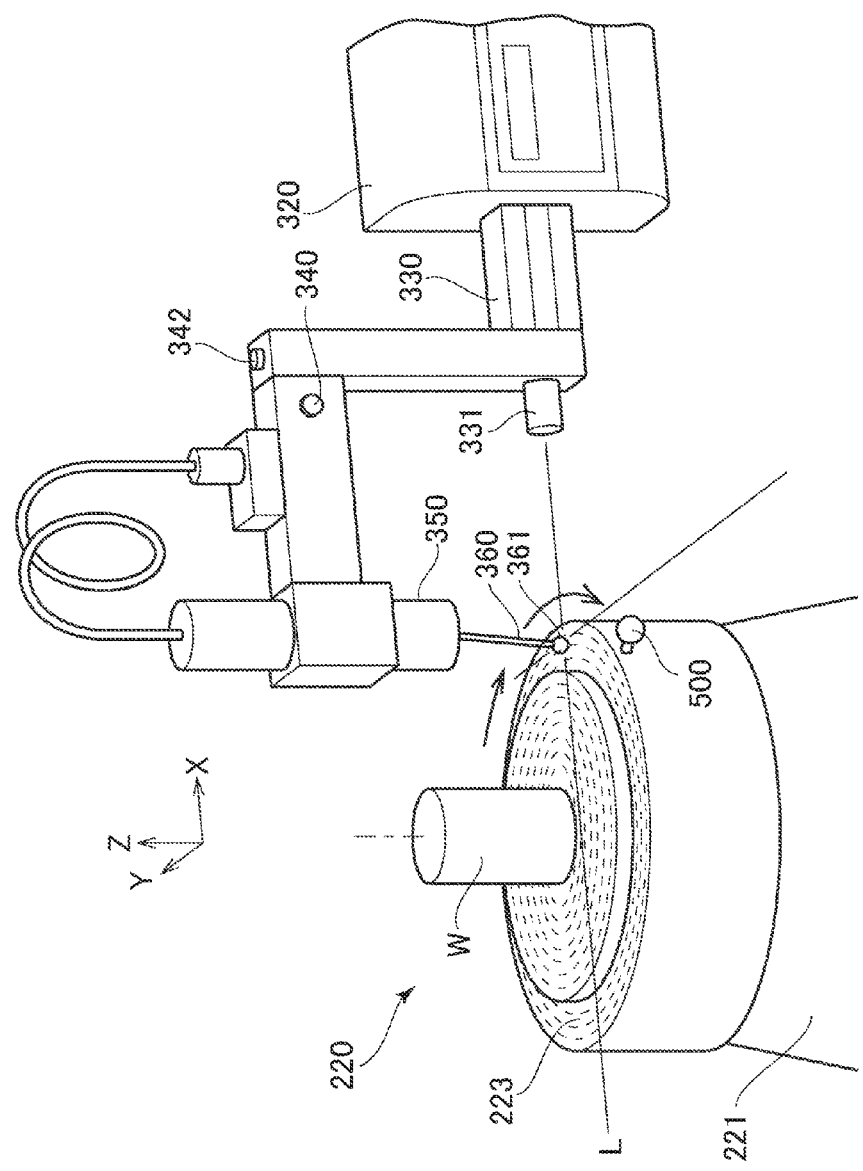
FIG. 25 illustrates a first modification, in which a calibration gauge is set on a lateral surface of a rotary table.

Several exemplary modifications of the present embodiment are described. Because the calibration gauge 500 is set outside the center of the rotary table 220, the calibration gauge 500 may be set on a side surface of the rotary table 220, as shown in FIG. 25, for example. In this case, even when the calibration gauge 500 is left attached to the rotary table 220, there is no effect whatsoever on measurement of the measured object W. Therefore, the calibration gauge 500 may be left attached to the side surface of the rotary table 220 at all times.

Second Modification

Figure 26:
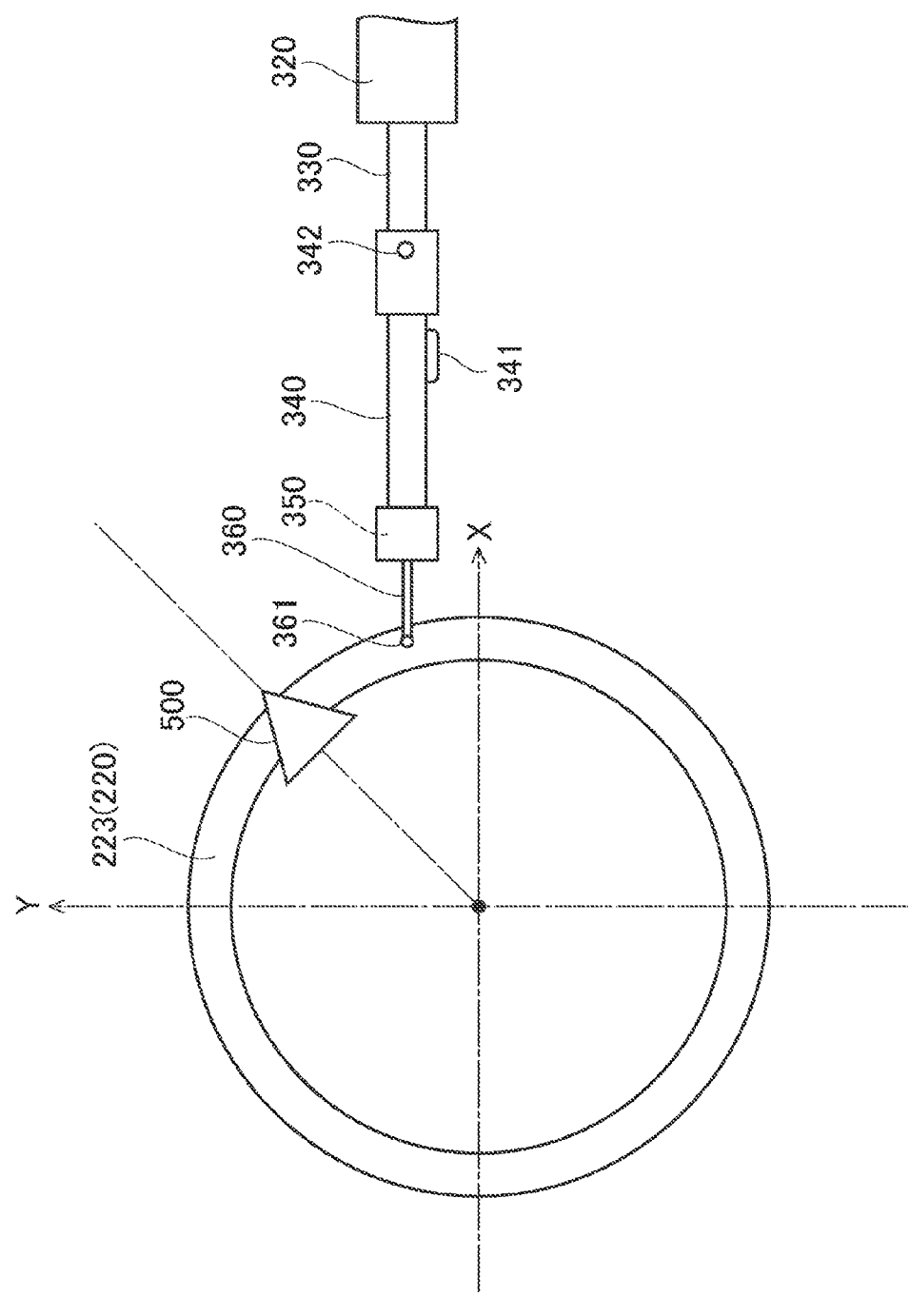
FIG. 26 illustrates a second modification, in which a calibration gauge is not a sphere.
Figure 27:
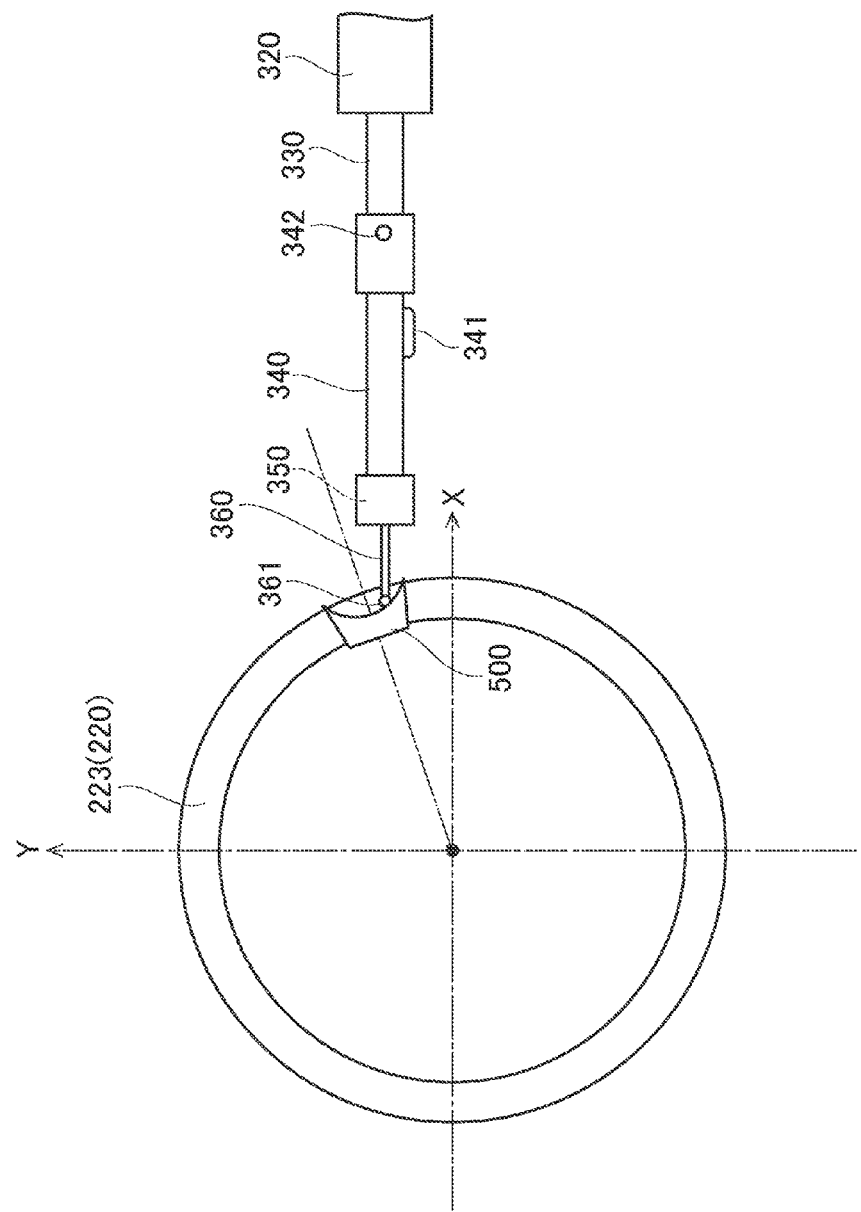
FIG. 27 illustrates the second modification, in which the calibration gauge is not a sphere.

The calibration gauge 500 is not limited to a sphere. The calibration gauge 500 need only have symmetry with respect to the peak value, i.e., a diagram with so-called plane symmetry. For example, the calibration gauge 500 may be a polygonal shape such as a regular prism or pyramid having plane symmetry, such as a triangular prism or triangular pyramid (a shape having a base surface that is an equilateral triangle or an isosceles triangle), as shown in FIG. 26. The calibration gauge 500 is not limited to a diagram having a projecting shape and may instead be a concave shape, such as that shown in FIG. 27, for example, so long as the calibration gauge 500 has plane symmetry. In such a case, a location where the concave portion is most deeply recessed corresponds to the peak value. In this connection, when the calibration gauge 500 is a sphere, the calibration gauge 500 obviously has plane symmetry with respect to all planes passing through a center of the sphere. In contrast, when a non-spherical calibration gauge 500 is set on the rotary table 220, the calibration gauge 500 must be set on the rotary table 220 such that the rotation axis and diameter of the rotary table 220 lie on a plane of symmetry of the calibration gauge 500.

Third Modification

In the embodiment described above, the host computer 110 finds in which direction the measurement axis L is offset based on the measurement results of the calibration gauge 500 and displays these results to the user with a monitor display. Therefore, the task of measurement axis alignment is performed via manual operations conducted by the user. In contrast, a configuration is also possible in which a quantitative calculation is performed of how much and in which direction the measurement axis L is offset based on the measurement results of the calibration gauge 500, and a calibration amount is specifically calculated. In addition to a calibration direction, the calibration amount may also be displayed to the user with the monitor display. The user may perform operations so as to displace the measurement axis L by the indicated calibration amount. Alternatively, the measurement axis alignment may be configured so as to be performed automatically through automatic control by the host computer 110 in accordance with the calculated calibration amount. When a diameter or installation position (distance from the rotation center) of the calibration gauge 500, and moreover an inclination angle of the stylus 360 or head holder 340, is known, specifically calculating the calibration amount is theoretically possible (due to being a geometric calculation).

Alternatively, the description of the above-noted embodiment assumes that a calibration operation referred to as "measurement axis alignment" is performed. However, a configuration is also possible in which a roundness measuring device understands an axis offset direction and axis offset amount, and performs correction calculation of a measured value in accordance with the axis offset direction and axis offset amount.

Moreover, the present invention is not limited to the embodiment described above, and may be modified as needed without departing from the scope of the present invention. In the above-described embodiment, a configuration is exemplified in which the measurement axis L is moved by the calibration screws 341 and 342 provided to the head holder 340. However, measurement axis alignment is an alignment of the rotation axis of the rotary table 220 and the measurement axis L of the stylus head 361, and therefore the rotary table may also be configured to displace along the Y axis.

A method of providing the program (axis offset determination program) to the host computer is not limited. A (non-volatile) recording medium on which the program is recorded may be inserted directly into the computer and the program installed, or a reading device reading information on a recording medium may be externally attached to the computer and the program may be installed on the computer from the reading device, or the program may be provided to the computer wirelessly or via a communication circuit such as the Internet, a LAN cable, or a telephone circuit.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A calibration method of a form measuring device, wherein the form measuring device includes:
   a rotary table on which a target object to be measured is to be placed, the rotary table being configured to be rotatable around a Z axis among an X axis, an Y axis, and the Z axis, wherein the X axis, the Y axis, and the Z axis are mutually orthogonal to each other; and
   a coordinate measurer:
      having a stylus head configured to detect the target object,
      configured to cause the stylus head to be linearly displaced in a direction parallel to the X axis, and
      configured to execute a tracing measurement along a surface of the target object using the stylus head,
   the calibration method comprising:
   when an imaginary line running through a center of the stylus head and parallel to the X axis is taken as a measurement axis, setting a calibration gauge having plane symmetry in a position other than a rotation center of the rotary table;

measuring the calibration gauge while driving the rotary table to rotate,
wherein the measuring includes measuring a phase of the rotatory table
when an initial contact between the stylus head and the calibration gauge is made,
when a linear displacement of the stylus head is greatest during the contact, and
when the contact between the stylus head and the calibration gauge is terminated; and
determining, based on a pattern of measured phases of the rotary table, whether the measurement axis is offset with respect to a rotation axis of the rotary table.

2. The calibration method according to claim 1, further comprising:
determining, based on measurement results of the calibration gauge,
a detection initiation phase θi, which is a phase of the rotary table when the initial contact between the stylus head and the calibration gauge is made;
a detection end phase θf, which is a phase of the rotary table when the contact between the stylus head and the calibration gauge is terminated; and
a peak phase θp, which is a phase of the rotary table when the linear displacement of the stylus head is greatest during the contact; and
when an axis offset index value M is defined such that M={(θp−θi)−(θf−θp)}, determining a direction of offset of the measurement axis depending on whether the axis offset index value M is one of positive and negative.

3. The calibration method according to claim 2, wherein the calibration gauge is set on a side surface of the rotary table in advance of the measuring of the calibration gauge.

4. The calibration method according to claim 2, wherein the calibration gauge is one of an entire and a partial sphere.

5. The calibration method according to claim 3, wherein the calibration gauge is one of an entire and a partial sphere.

6. The calibration method according to claim 1, wherein the calibration gauge is set on a side surface of the rotary table in advance of the measuring of the calibration gauge.

7. The calibration method according to claim 6, wherein the calibration gauge is one of an entire and a partial sphere.

8. The calibration method according to claim 1, wherein the calibration gauge is one of an entire and a partial sphere.

9. A calibration method of a form measuring device, wherein the form measuring device includes:
a rotary table on which a target object to be measured is to be placed, the rotary table being configured to be rotatable around a Z axis among an X axis, an Y axis, and the Z axis, wherein the X axis, the Y axis, and the Z axis are mutually orthogonal to each other; and
a coordinate measurer:
having a stylus head configured to detect the target object,
configured to cause the stylus head to be linearly displaced in a direction parallel to the X axis, and
configured to execute a tracing measurement along a surface of the target object using the stylus head,
wherein positions of the stylus head and the rotary table are configured to allow fine calibration in a direction along the Y axis,
the calibration method comprising:
when an imaginary line running through a center of the stylus head and parallel to the X axis is taken as a measurement axis, setting a calibration gauge having plane symmetry in a position other than a rotation center of the rotary table;
measuring the calibration gauge while driving the rotary table to rotate,
wherein the measuring includes measuring a phase of the rotatory table
when an initial contact between the stylus head and the calibration gauge is made,
when a linear displacement of the stylus head is greatest during the contact, and
when the contact between the stylus head and the calibration gauge is terminated;
determining, based on a pattern of measured phases of the rotary table, whether the measurement axis is offset with respect to a rotation axis of the rotary table;
after the determining whether the measurement axis is offset, displaying determination results of an offset direction of the measurement axis on a monitor; and
performing, using the determination results of the offset direction of the measurement axis, fine calibration of a position of the stylus head.

10. The calibration method according to claim 9, further comprising:
determining, based on measurement results of the calibration gauge,
a detection initiation phase θi, which is a phase of the rotary table when the initial contact between the stylus head and the calibration gauge is made;
a detection end phase θf, which is a phase of the rotary table when the contact between the stylus head and the calibration gauge is terminated; and
a peak phase θp, which is a phase of the rotary table when the linear displacement of the stylus head is greatest during the contact; and
when an axis offset index value M is defined such that M={(θp−θi)−(θf−θp)}, determining a direction of offset of the measurement axis depending on whether the axis offset index value M is one of positive and negative.

11. The calibration method according to claim 10, wherein the calibration gauge is set on a side surface of the rotary table in advance of the measuring of the calibration gauge.

12. The calibration method according to claim 10, wherein the calibration gauge is one of an entire and a partial sphere.

13. The calibration method according to claim 11, wherein the calibration gauge is one of an entire and a partial sphere.

14. The calibration method according to claim 9, wherein the calibration gauge is set on a side surface of the rotary table in advance of the measuring of the calibration gauge.

15. The calibration method according to claim 14, wherein the calibration gauge is one of an entire and a partial sphere.

16. The calibration method according to claim 9, wherein the calibration gauge is one of an entire and a partial sphere.

17. A non-transitory computer-readable storage medium storing a program product for calibrating a form measuring device, wherein the form measuring device includes:
a rotary table on which a target object to be measured is placed, the rotary table being configured to be rotatable around a Z axis among an X axis, an Y axis, and the Z axis, wherein the X axis, the Y axis, and the Z axis are mutually orthogonal to each other;
a coordinate measurer:

having a stylus head configured to detect the target object, configured to cause the stylus head to be linearly displaced in a direction parallel to the X axis, and configured to execute a tracing measurement along a surface of the target object using the stylus head, wherein a calibration gauge having a plane symmetry is set at a position other than a rotation center of the rotary table; and a computer performing operation control of the rotary table and the coordinate measurer via a motion controller, the program product causing the computer to execute:

when an imaginary line running through a center of the stylus head and parallel to the X axis is taken as a measurement axis, determining axis offset of the form measuring device;

measuring the calibration gauge while driving the rotary table to rotate;

wherein the measuring includes measuring a phase of the rotary table when an initial contact between the stylus head and the calibration gauge is made, when a linear displacement of the stylus head is greatest during the contact, and when the contact between the stylus head and the calibration gauge is terminated; and determining, based on a pattern of measured phases of the rotary table, whether the measurement axis is offset with respect to a rotation axis of the rotary table.

18. A form measuring device comprising:

a rotary table on which a target object to be measured is to be placed, the rotary table being configured to be rotatable around a Z axis among an X axis, an Y axis, and the Z axis, wherein the X axis, the Y axis, and the Z axis are mutually orthogonal to each other;

a calibration gauge having plane symmetry and positioned in a position other than a rotation center of the rotary table; and a coordinate measurer:

having a stylus head configured to detect the target object, configured to cause the stylus head to be linearly displaced in a direction parallel to the X axis, and configured to execute a tracing measurement along a surface of the target object using the stylus head, wherein the tracing measurement includes measuring a phase of the rotary table when an initial contact between the stylus head and the target object is made, when a linear displacement of the stylus head is greatest during the contact, and when the contact between the stylus head and the target object is terminated.

* * * * *